United States Patent
Yonemura et al.

(10) Patent No.: US 9,972,211 B2
(45) Date of Patent: May 15, 2018

(54) COMMUNICATION DEVICE AND COMMUNICATION METHOD

(71) Applicant: Kabushiki Kaisha Toshiba, Minato-ku (JP)

(72) Inventors: Tomoko Yonemura, Kawasaki (JP); Takeshi Kawabata, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days. days.

(21) Appl. No.: 15/443,682

(22) Filed: Feb. 27, 2017

(65) Prior Publication Data

US 2018/0040246 A1    Feb. 8, 2018

(30) Foreign Application Priority Data

Aug. 8, 2016 (JP) ................. 2016-155597

(51) Int. Cl.
*G08G 1/16* (2006.01)
(52) U.S. Cl.
CPC ............. *G08G 1/161* (2013.01); *G08G 1/164* (2013.01)
(58) Field of Classification Search
CPC ............................ G08G 1/161; G08G 1/164
See application file for complete search history.

(56) References Cited

U.S. PATENT DOCUMENTS

| | | | |
|---|---|---|---|
| 2012/0034876 A1* | 2/2012 | Nakamura | H04L 9/321 455/66.1 |
| 2013/0145159 A1 | 6/2013 | Nakaoka et al. | |
| 2013/0156017 A1 | 6/2013 | Hori et al. | |

FOREIGN PATENT DOCUMENTS

| | | |
|---|---|---|
| EP | 2 816 755 A1 | 12/2014 |
| JP | 2006-87035 | 3/2006 |
| JP | 2006-101290 | 4/2006 |
| JP | 2009-276991 | 11/2009 |

OTHER PUBLICATIONS

"Intelligent Transport Systems (ITS); Security; Stage 3 mapping for IEEE 1609.2," ETSI TS 102 867 V1.1.1 (Jun. 2012), DTS/ITS-0050013, 2012, pp. 26.

(Continued)

*Primary Examiner* — Leon Flores
(74) *Attorney, Agent, or Firm* — Oblon, McClelland, Maier & Neustadt, L.L.P.

(57) ABSTRACT

According to an embodiment, a communication device is installed in a movable body and includes a receiver, a verifier, and a mapping generator. The receiver is configured to receive a synthesis message including synthesis information and second verification information. The synthesis information is information about motion of a plurality of movable bodies including the movable body installed with the device; the second verification information is information indicative of a validity of the synthesis information. The verifier is configured to verify the validity of the synthesis information on the basis of the second verification information. The mapping generator is configured to generate mapping information on the basis of the synthesis information verified as valid. The mapping information represents a relative position of at least one of the movable bodies with respect to the movable body installed with the device.

21 Claims, 19 Drawing Sheets

(56) References Cited

OTHER PUBLICATIONS

"Intelligent Transport Systems (ITS);Vehicular Communications; Basic Set of Applications; Part 3: Specifications of Decentralized Environmental Notification Basic Service" ETSI TS 102 637-3 V1.1.1 (Sep. 2010), DTS/ITS-0010002-3, 2010, pp. 46.
Tomoko Yonemura et al., "A Few Remarks on Multi-Scalar Multiplication Methods suited to an ECDSA Verification Process for V2X Communications," SCIS 2016 Symposium on Cryptography and Information Security, The Institute of Electronics, Information and Communication Engineers, Jan. 2016, pp. 22.

* cited by examiner

COMMUNICATION DEVICE AND COMMUNICATION METHOD

CROSS-REFERENCE TO RELATED APPLICATIONS

This application is based upon and claims the benefit of priority from Japanese Patent Application No. 2016-155597, filed on Aug. 8, 2016; the entire contents of which are incorporated herein by reference.

FIELD

Embodiments described herein relate generally to a communication device and a communication method.

BACKGROUND

Driving assistance communication systems are known. Such systems are used to allow vehicles to move around more smoothly. In a driving assistance communication system, vehicles wirelessly transmit vehicle information including their driving state to other vehicles and wirelessly receive the vehicle information from other vehicles. With this system, for example, a vehicle at an intersection can acquire information on other vehicles approaching the intersection from blind spots, and can avoid contacting the other vehicles.

The driving assistance communication system needs to make sure that the vehicle information communicated among vehicles is not falsified information, and that the vehicle information is not transmitted from a spoofed source address. Thus, the vehicle information communicated in the driving assistance communication system includes verification information for ensuring validity, such as integrity of information and authenticity of a transmission source. The verification information is, for example, a message authentication code using a shared key encryption system or a digital signature using a public key encryption system. A transmitter vehicle adds the verification information to the vehicle information. A receiver vehicle verifies the vehicle information on the basis of the added verification information.

In the driving assistance communication system, two or more vehicles broadcast the vehicle information on the same channel (the same frequency band). This configuration requires more processing capability of a communication device installed in each of the vehicles in receiving information than that in transmitting information.

For example, the communication device broadcasts a combination of the vehicle information and the verification information predetermined times per second, such as 10 times per second. The communication device also receives the combination of the vehicle information and the verification information from each of the vehicles that are present therearound. Thus, the communication device needs to receive the combination of the vehicle information and the verification information the number of times equal to the transmission frequency per second multiplied by the number of vehicles present therearound. When, for example, 100 vehicles are present therearound, the communication device needs to receive the combination of the vehicle information and the verification information 1000 times per second.

Verification processing accounts for a relatively large proportion of the overall reception processing. Thus, the driving assistance communication system is required to reduce the load of the verification processing performed in each vehicle on the vehicle information.

DETAILED DESCRIPTION

According to an embodiment, a communication device is installed in a movable body and includes a receiver, a verifier, and a mapping generator. The receiver is configured to receive a synthesis message including synthesis information and second verification information. The synthesis information is information about motion of a plurality of movable bodies including the movable body installed with the device; the second verification information is information indicative of a validity of the synthesis information. The verifier is configured to verify the validity of the synthesis information on the basis of the second verification information. The mapping generator is configured to generate mapping information on the basis of the synthesis information verified as valid. The mapping information represents a relative position of at least one of the movable bodies with respect to the movable body installed with the device.

A driving assistance communication system 10 according to embodiments will be described in detail below with reference to the accompanying drawings. It is an object of the driving assistance communication system 10 according to the embodiments to reduce the load of the verification processing performed in each vehicle on the vehicle information. Several embodiments will be described below, in which like reference signs represent like parts having common functions, and duplicate explanations are omitted.

First Embodiment

Figure 1:
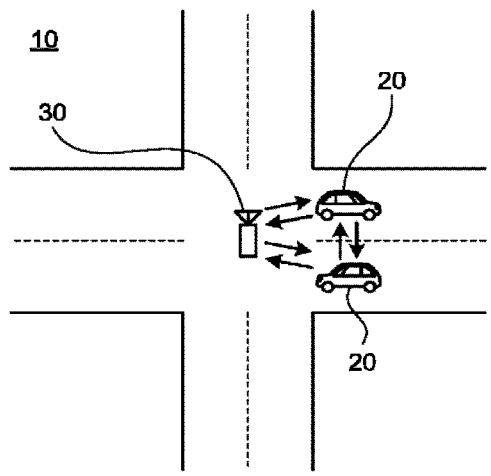
FIG. 1 is a diagram schematically illustrating a driving assistance communication system.
Figure 2:
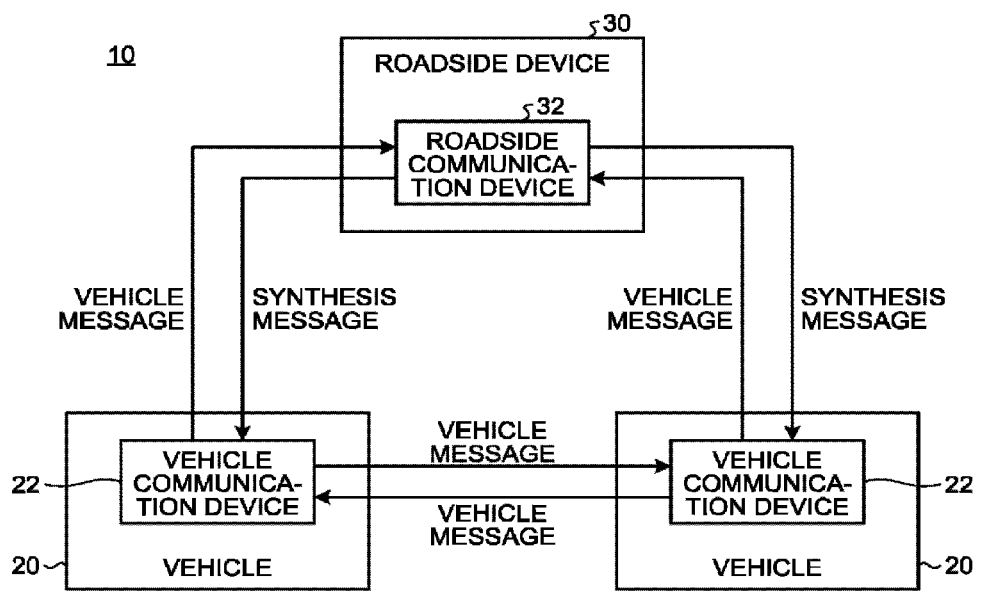
FIG. 2 is a diagram illustrating a configuration of the driving assistance communication system.

FIG. 1 is a diagram schematically illustrating the driving assistance communication system 10. FIG. 2 is a block diagram illustrating a configuration of the driving assistance communication system 10.

The driving assistance communication system 10 includes two or more vehicles 20 and at least one roadside device 30. The vehicles 20 are movable bodies moving on roads, such as automobiles, motorbikes, bicycles and pedestrian holding a device. The driving assistance communication system 10 may be applied not only to the vehicles 20 but to other movable bodies. The roadside device 30 is a device installed on a roadside. The roadside device 30 is installed, for example, on a road on which the vehicles 20 are running, on an intersection with signals, or on a parking lot. The roadside device 30 may not be fixed to the roadside, and may be portably moved as appropriate.

Each vehicle 20 includes a vehicle communication device 22. The roadside device 30 includes a roadside communication device 32. The vehicle communication device 22 and the roadside communication device 32 wirelessly communicate information (messages) with each other on radio waves.

The vehicle communication device 22 and the roadside communication device 32 transmit and receive messages on a common channel (frequency band) by a common method. The vehicle communication device 22 and the roadside communication device 32 each set a transmission timing, encode and modulate, by a predetermined method, a message to be transmitted, and wirelessly transmit the message into a certain channel at the respective transmission timings. The message transmitted wirelessly by the vehicle communication device 22 and the roadside communication device 32 is broadcast on the certain channel and is received by other devices inside a communication area.

The vehicle communication device 22 and the roadside communication device 32 are on standby in periods other than the transmission timing, waiting for a message coming transmitted wirelessly from other devices on the certain channel. When a message is transmitted on the certain channel from another of the devices in a period other than the transmission timing, the vehicle communication device 22 and the roadside communication device 32 can receive the message from the other device.

The vehicle communication device 22 broadcasts a vehicle message (movable body message) at certain intervals. The vehicle message includes vehicle information (movable body information) and first verification information indicative of the validity of the vehicle information. The vehicle information is information about a motion of the vehicle 20. The vehicle communication device 22 can provide information about a motion of a device-installed vehicle to the roadside device 30 and vehicles 20 nearby by transmitting the vehicle information. Details of the vehicle message will be described later with reference to FIG. 3.

The device-installed vehicle (device-installed movable body) is a vehicle 20 in which the subject vehicle communication device 22 is installed. Other vehicles (other movable bodies) are vehicles 20 other than the vehicle 20 in which the subject vehicle communication device 22 is installed.

The roadside communication device 32 receives the vehicle message transmitted from the vehicle communication device 22. The roadside communication device 32 verifies the validity of the vehicle information included in the vehicle message on the basis of the first verification information included in the vehicle message. The roadside communication device 32 stores therein the vehicle information verified as valid. Thus, the roadside communication device 32 can acquire, from vehicles 20 around the roadside device 30 (vehicles 20 in a communicable area), information about motions of the vehicles 20.

The roadside communication device 32 broadcasts a synthesis message at certain intervals. The synthesis message includes synthesis information and second verification information indicative of the validity of the synthesis information. The synthesis information is information about motions of one or more vehicles 20 generated on the basis of the vehicle information verified as valid. Thus, the roadside communication device 32 can transmit information about motions of one or more vehicles 20 around the roadside device 30 to each of the one or more vehicles 20 around the roadside device 30. Details of the synthesis message will be described later with reference to FIG. 3.

The vehicle communication device 22 receives a vehicle message transmitted from a vehicle 20 that is present therearound (vehicle 20 in a communicable area). The vehicle communication device 22 verifies the validity of the vehicle information included in the vehicle message on the basis of the first verification information included in the vehicle message.

The vehicle communication device 22 receives a synthesis message transmitted from the roadside device 30 that is present therearound (roadside device 30 in a communicable area). The vehicle communication device 22 verifies the validity of the synthesis information included in the synthesis message on the basis of the second verification information included in the synthesis message. The vehicle communication device 22 extracts one or more pieces of vehicle information from the synthesis information verified as valid.

The vehicle communication device 22 generates mapping information representing, for example, a vehicle body size, a relative position to the device-installed vehicle, and a moving direction on the basis of the vehicle information verified as valid and the one or more pieces of vehicle information extracted from the synthesis information. The vehicle communication device 22 analyzes a collision possibility that the device-installed vehicle and another of the vehicles will have a collision on the basis of the mapping information. With this configuration, the vehicle communication device 22 can alert the driver of the device-installed vehicle to the presence of vehicles, if any, susceptible to collide with the device-installed vehicle, and can control the motion of the device-installed vehicle to avoid collision (e.g., near miss, contact, and collision) with the vehicles.

Figure 3:
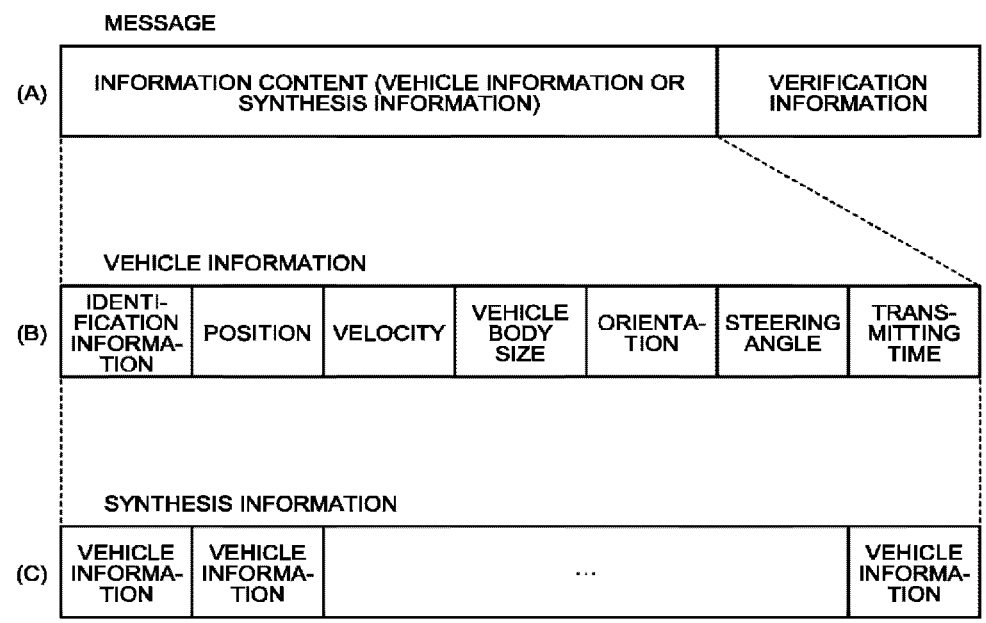
FIG. 3 is a diagram illustrating information included in a message.

FIG. 3 is a diagram illustrating information included in a message. Messages are transmitted and received among vehicles 20 and between a vehicle 20 and the roadside device 30. Each message includes information content and verification information as illustrated in (A) of FIG. 3.

The verification information is information for verifying whether the information content is valid. The verification information is, for example, a message authentication code using a shared key encryption system or a digital signature using a public key encryption system. A message having such verification information can ensure the integrity of the information content and authenticity of the transmission source.

When the message is a vehicle message, the information content is vehicle information. As illustrated in (B) of FIG. 3, for example, the vehicle information includes identification information, position, velocity, vehicle body size, orientation, steering angle, and transmitting time.

Identification information is information for distinguishing the vehicle 20 (or the vehicle communication device 22) that has transmitted the vehicle information from other vehicles 20 (or other vehicle communication devices 22). The position indicates a position of the vehicle 20 that has transmitted the vehicle information in terms of, for example, latitude and longitude. The vehicle body size indicates the size of the vehicle 20 that has transmitted the vehicle information. The orientation indicates the direction (north, south, east, and west directions) in which the vehicle 20 that has transmitted the vehicle information is oriented. The steering angle is a rotation angle of a steering wheel of the vehicle 20 that has transmitted the vehicle information. The steering angle indicates the direction in which the vehicle 20 is going to move. The transmitting time indicates the time at which the vehicle information was transmitted. The vehicle information may include other information or may exclude a part of these pieces of information.

When the message is a synthesis message, the information content is synthesis information. As illustrated in (C) of FIG. 3, the synthesis information includes, for example, one or more pieces of vehicle information. Specifically, the synthesis information includes the vehicle information acquired in a certain period before the transmission timing of the synthesis information and verified as valid. The synthesis information is information in which one or more pieces of vehicle information are concatenated. The synthesis information may be information in which one or more pieces of vehicle information are encoded by a certain method. The synthesis information may include information other than the vehicle information.

Figure 4:
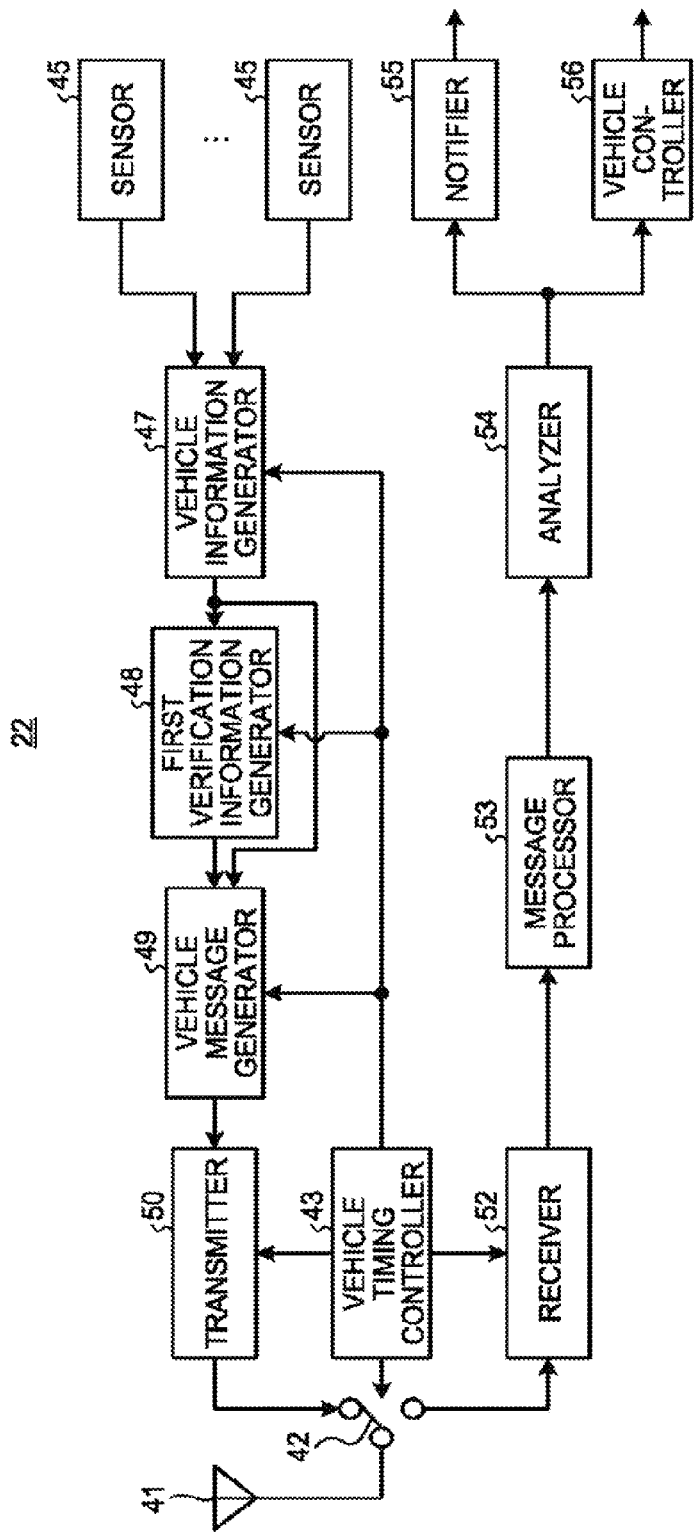
FIG. 4 is a diagram illustrating a functional configuration of a vehicle communication device according to a first embodiment.

FIG. 4 is a diagram illustrating a functional configuration of the vehicle communication device 22 according to the first embodiment. The vehicle communication device 22 includes an antenna 41, a switch 42, a vehicle timing controller 43, at least one sensor 45, a vehicle information generator 47, a first verification information generator 48, a vehicle message generator 49, a transmitter 50, a receiver 52, a message processor 53, an analyzer 54, a notifier 55, and a vehicle controller 56.

The antenna 41 radiates electromagnetic waves into a certain channel. The antenna 41 receives the electromagnetic waves propagated on the certain channel.

The switch 42 connects the transmitter 50 to the antenna 41 at the transmission timing to transmit a signal output from the transmitter 50 into the certain channel via the antenna 41. The switch 42 connects the receiver 52 to the antenna 41 in a reception period (period other than the transmission timing) to provide a signal acquired by the antenna 41 to the receiver 52.

The vehicle timing controller 43 controls the transmission timing such that the vehicle message is transmitted at predetermined transmission intervals. The vehicle timing controller 43 causes the transmitter 50 to connect to the antenna 41 and to transmit a vehicle message at the transmission timing. The vehicle timing controller 43 causes the vehicle information generator 47, the first verification information generator 48, and the vehicle message generator 49 to perform processing in advance of the transmission timing so that the vehicle message can be transmitted at the transmission timing.

The at least one sensor 45 detects various types of information needed to generate the vehicle information. The at least one sensor 45 detects, for example, the position of the vehicle 20 in terms of, for example, latitude and longitude, the orientation of the vehicle 20 in terms of north, south, east, and west directions, and the rotation angle of the steering wheel of the vehicle 20. Each of the at least one sensor 45 provides the detection result to the vehicle information generator 47.

The vehicle information generator 47 generates the vehicle information at every transmission interval of the vehicle message. In this case, the vehicle information generator 47 acquires the detection result from each of the at least one sensor 45 a first predetermined time before the transmission timing of the vehicle message. The first predetermined time is a processing time period for generating the vehicle information, generating the verification information, generating the vehicle message, and transmitting the generated vehicle message. The vehicle information generator 47 generates the vehicle information on the basis of, for example, the detection result and predetermined information. The vehicle information generator 47 generates vehicle information including identification information, position, velocity, vehicle body size, orientation, steering angle, and transmitting time. The vehicle information generator 47 stores therein the identification information and the vehicle body size in advance. The vehicle information generator 47 may acquire the transmitting time from, for example, a time generator.

The first verification information generator 48 receives the vehicle information generated by the vehicle information generator 47. The first verification information generator 48 generates verification information indicative of the validity of the received vehicle information.

The vehicle message generator 49 receives the vehicle information generated by the vehicle information generator 47 and the verification information generated by the first verification information generator 48. The vehicle message generator 49 generates a vehicle message including the received vehicle information and the received verification information.

The transmitter 50 receives, from the vehicle message generator 49, the vehicle message generated in advance of the transmission timing. The transmitter 50 transmits the received vehicle message into a certain channel via the antenna 41 at the transmission timing specified by the vehicle timing controller 43.

The receiver 52 receives information on the certain channel via the antenna 41 in a period other than the transmission timing specified by the vehicle timing controller 43. Specifically, the receiver 52 receives a synthesis message that the roadside communication device 32 of the roadside device 30 has transmitted into the certain channel. The receiver 52 also receives a vehicle message that another of the vehicles has transmitted into the certain channel.

The message processor 53 receives the synthesis message and the vehicle message received by the receiver 52. The message processor 53 generates mapping information on the basis of the received synthesis message and the received vehicle message. The mapping information represents, for example, the vehicle body size, relative position to the device-installed vehicle, moving direction, and transmitting time of the source vehicle information of each of the one or mere vehicles 20 present therearound. Details of the message processor 53 will be described later with reference to FIG. 6.

The analyzer 54 analyzes, for example, a possibility that the device-installed vehicle and another of the vehicles will have a collision on the basis of the mapping information. The analyzer 54 analyzes, for example, a probability of collision (e.g., near miss, contact, and collision), predicted time of collision, and a contact position in collision. The analyzer 54 provides the analysis result to the notifier 55 and the vehicle controller 56.

The notifier 55 notifies the driver of the analysis result of analyzer 54. For example, the notifier 55 may display an alert on a monitor or output the alert by sound. The notifier 55 may further notify the driver of an instruction to avoid a collision.

The vehicle controller 56 controls the motion of the vehicle 20 on the basis of the analysis result of the analyzer 54. For example, the vehicle controller 56 controls the motion of the device-installed vehicle such that the device-installed vehicle can avoid a collision with other vehicles.

The sensor 45, the analyzer 54, the notifier 55, and the vehicle controller 56 may be installed in a device ether than the vehicle communication device 22. For example, the sensor 45, the analyzer 54, the notifier 55, and the vehicle controller 56 may be installed in a processor for controlling the vehicle, for example. The vehicle 20 may include only one of the notifier 55 and the vehicle controller 56. When, for example, the vehicle 20 has automatic driving functions, the vehicle 20 may include the vehicle controller 56. When, for example, the vehicle 20 has no automatic driving functions, the vehicle 20 may include the notification unit 55 instead of the vehicle controller 56.

Figure 5:
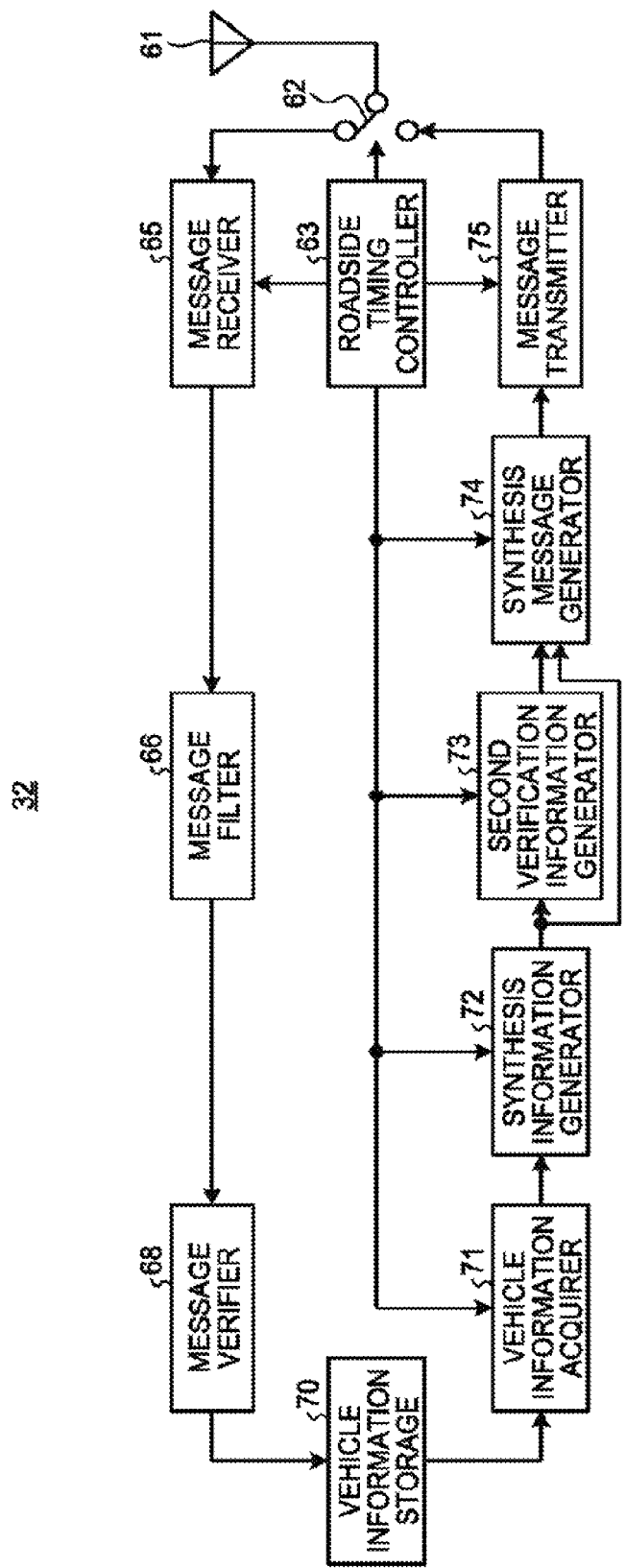
FIG. 5 is a diagram illustrating a functional configuration of a roadside communication device according to the first embodiment.

FIG. 5 is a diagram illustrating a functional configuration of the roadside communication device 32 according to the first embodiment. The roadside communication device 32 includes a roadside antenna 61, a roadside switch 62, a roadside timing controller 63, a message receiver 65, a message filter 66, a message verifier 68, a vehicle information storage 70, a vehicle information acquirer 71, a synthesis information generator 72, a second verification information generator 73, a synthesis message generator 74, and a message transmitter 75.

The roadside antenna 61 radiates electromagnetic waves into a certain channel. The roadside antenna 61 receives the electromagnetic waves propagated on the certain channel.

The roadside switch 62 connects the message transmitter 75 to the roadside antenna 61 at the transmission timing to transmit a signal output from the message transmitter 75 into the certain channel via the roadside antenna 61. The roadside switch 62 connects the message receiver 65 to the roadside antenna 61 in a reception period (period other than the transmission timing) to provide a signal acquired by the roadside antenna 61 to the message receiver 65.

The roadside timing controller 63 controls the transmission timing such that a synthesis message is transmitted at certain intervals. The roadside timing controller 63 causes the message transmitter 75 to connect to the roadside antenna 61 and to transmit the synthesis message at the transmission timing. The roadside timing controller 63 causes the vehicle information acquirer 71, the synthesis information generator 72, the second verification information generator 73, and the synthesis message generator 74 to perform processing in advance of the transmission timing so that the synthesis message can be transmitted at the transmission timing.

The message receiver 65 receives information on the certain channel via the roadside antenna 61 in a period other than the transmission timing specified by the roadside timing controller 63. Specifically, the message receiver 65 receives a vehicle message from a vehicle communication device 22 of a vehicle 20 around the roadside device 30 (vehicle 20 in a communicable area).

The message filter 66 deletes a vehicle message that satisfies a predetermined condition from among the vehicle messages received by the message receiver 65. The message filter 66 provides a vehicle message that fails to satisfy the predetermined condition to the message verifier 68.

For example, the message filter 66 deletes, from among the received vehicle messages, a vehicle message transmitted from a vehicle 20 further away than a predetermined distance. For example, the message filter 66 deletes a received vehicle message when the position included in the vehicle information of the received vehicle message is further away than a predetermined distance from the roadside device 30. With this configuration, the message filter 66 can delete the vehicle message transmitted from a vehicle 20 that is less likely to collide with vehicles 20 near the roadside device 30.

For example, the message filter 66 deletes, from among the received vehicle messages, a vehicle message transmitted from a vehicle 20 that has transmitted invalid vehicle information a predetermined time before to the present. For example, the message filter 66 stores therein the identification information included in the vehicle information verified as invalid by the subsequent message verifier 68 as invalid identification information for a certain time period. When the identification information included in the vehicle information in a received vehicle message agrees with the stored invalid identification information, the message filter 66 deletes the received vehicle message. This configuration eliminates the need for the message filter 66 to perform verification processing on invalid vehicle information.

For example, the message filter 66 deletes, from among the received vehicle messages, a vehicle message having an unusual value among values included in the vehicle information. When, for example, a certain value included in the vehicle information is outside of a predetermined range, the message filter 66 determines the certain value to be unusual. When, for example, a certain value included in the vehicle information varies from a previous value (such as an immediately previous value or a mean value of values acquired before certain time) beyond a predetermined range, the message filter 66 determines the certain value to be unusual. This configuration eliminates the need for the message filter 66 to perform verification processing on the vehicle information that may be highly likely erroneous information.

For example, the message filter 66 deletes, from among the received vehicle messages, a vehicle message transmitted from a vehicle 20 that has transmitted vehicle information having an unusual value a predetermined time before to the present. For example, the message filter 66 stores therein the identification information included in vehicle information having a value determined to be unusual as identification information of the vehicle information having an unusual value for a certain time period. When the identification information included in the vehicle information of a received vehicle message agrees with the stored identification information of the vehicle information having an unusual value, the message filter 66 deletes the received vehicle message. This configuration eliminates the need for the message filter 66 to perform verification processing on the vehicle information having an unusual value.

The message verifier 68 acquires the vehicle message that has passed through the message filter 66. The message verifier 68 verifies the validity of the vehicle information included in the received vehicle message on the basis of the verification information included in the received vehicle message. When the message verifier 68 determines that the vehicle information is valid, the message verifier 68 writes the vehicle information in the vehicle information storage 70. When the message verifier 68 determines that the vehicle information is invalid, the message verifier 68 deletes the vehicle information without writing it. The vehicle information storage 70 stores therein vehicle information verified as valid.

The vehicle information acquirer 71 reads one or more pieces of vehicle information written in the vehicle information storage 70 at every transmission interval of the synthesis message. In this case, the vehicle information acquirer 71 reads one or more pieces of vehicle information written in the vehicle information storage 70 a second predetermined time before the transmission timing of the synthesis message. The second predetermined time is a processing time period for generating the synthesis information, generating the verification information, generating the synthesis message and transmitting the generated synthesis message. The vehicle information acquirer 71 reads vehicle information from the vehicle information storage 70 and then deletes the already read vehicle information from the vehicle information storage 70 or sets a flag on this vehicle information. This configuration can prevent the vehicle information acquirer 71 from reading the same vehicle information again at and after the next processing.

The synthesis information generator 72 generates synthesis information that is information about motions of two or more vehicles 20 on the basis of one or more pieces of vehicle information read by the vehicle information acquirer 71 and verified as valid. In the first embodiment, the synthesis information generator 72 generates the synthesis information by concatenating one or more pieces of vehicle information verified as valid. The synthesis information generator 72 may generate the synthesis information by using other methods as long as the vehicles 20 can reproduce the one or more pieces of vehicle information from the synthesis information.

The second verification information generator 73 generates verification information indicative of the validity of the synthesis information generated by the synthesis information generator 72. The synthesis message generator 74 generates a synthesis message including the synthesis information generated by the synthesis information generator 72 and the verification information indicative of the validity of the synthesis information.

The message transmitter 75 receives, from the synthesis message generator 74, the synthesis message generated in advance of the transmission timing. The message transmitter 75 transmits the received synthesis message into a certain channel via the roadside antenna 61 at the transmission timing specified by the roadside timing controller 63.

Figure 6:
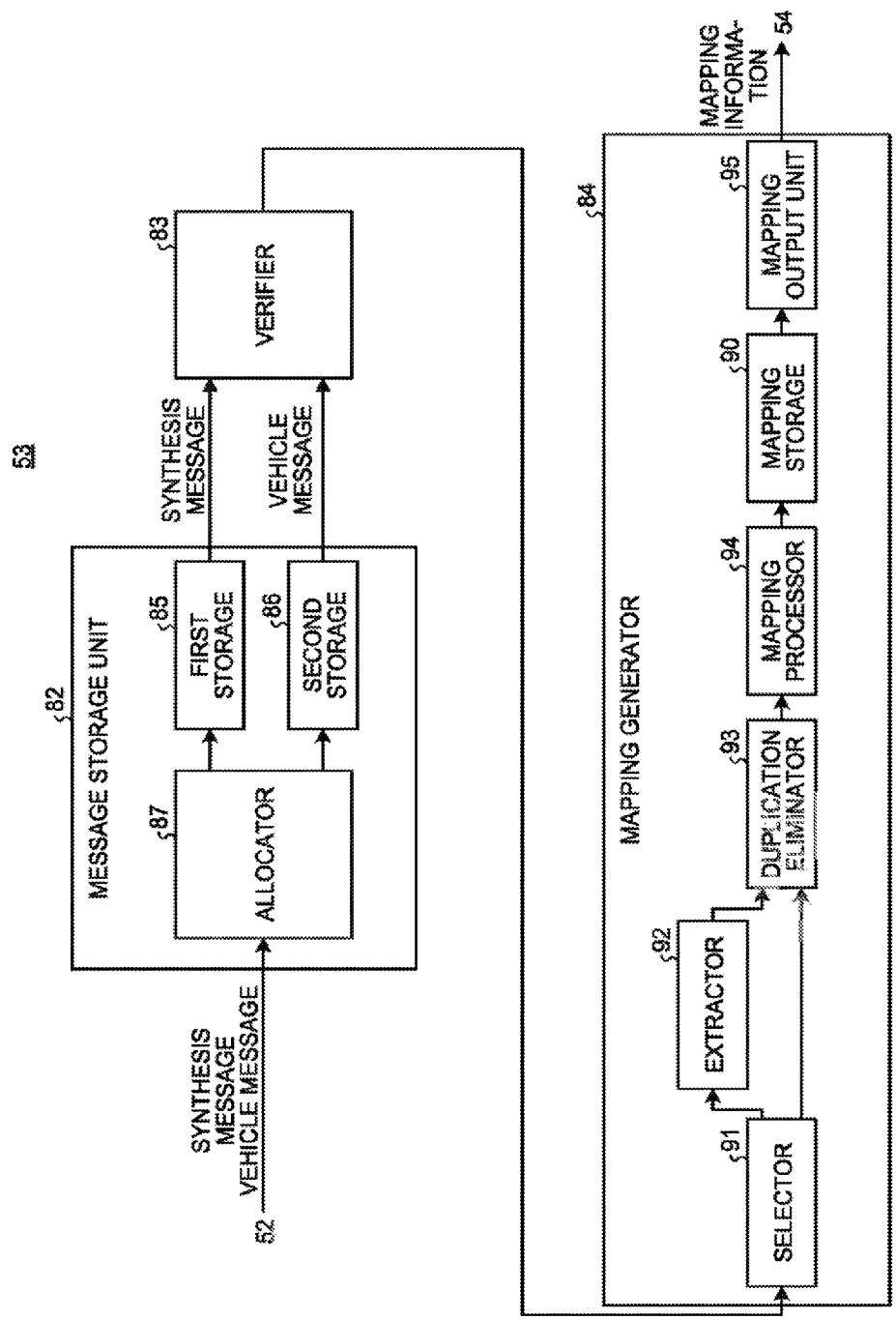
FIG. 6 is a diagram illustrating a functional configuration of a message processor according to the first embodiment.

FIG. 6 is a diagram illustrating a functional configuration of the message processor 53 included in the vehicle communication device 22 according to the first embodiment. The message processor 53 includes a message storage 82, a verifier 83, and a mapping generator 84.

The message storage 82 stores therein the synthesis message or the vehicle message received by the receiver 52. The message storage 82 includes, for example, a first storage 85, a second storage 86, and an allocator 87. The first storage 85 stores therein synthesis messages. The second storage 86 stores therein vehicle messages. The allocator 87 acquires the synthesis message and the vehicle message received by the receiver 52. The allocator 87 writes the synthesis message in the first storage 85 and writes the vehicle message in the second storage 86.

The verifier 83 reads the messages from the first storage 85 and the second storage 86. The first storage 85 and the second storage 86 may be first-in, first-out (FIFO) memories. When the first storage 85 and the second storage 86 are FIFO memories, the verifier 83 reads a first entry message first therefrom.

The verifier 83 reads the synthesis message and the vehicle message from the message storage 82 one by one and verifies whether the messages are valid. When the verifier 83 reads a synthesis message, the verifier 83 verifies the validity of the synthesis information included in the read synthesis message on the basis of the verification information included in the read synthesis message. When the verifier 83 reads a vehicle message, the verifier 83 verifies the validity of the vehicle information included in the read vehicle message on the basis of the verification information included in the read vehicle message. When the verifier 83 determines that the synthesis information or the vehicle information is valid, the verifier 83 provides the synthesis information or the vehicle information to the subsequent mapping generator 84. When the verifier 83 determines that the synthesis information or the vehicle information is invalid, the verifier 83 deletes the synthesis information or the vehicle information without providing it to the subsequent mapping generator 84.

The verifier 83 prioritizes verifying the synthesis information over verifying the vehicle information. When, for example, at least one synthesis message is stored in the message storage 82, the verifier 83 may read the synthesis message prior to the vehicle message and perform verification. When, for example, the synthesis message is stored in the first storage 85, the verifier 83 prioritizes reading the synthesis message from the first storage 85 and verifying the synthesis information. In this case, the verifier 83 reads the vehicle message from the second storage 86 and verifies the vehicle information, provided that no synthesis message is stored in the first storage 85.

For example, the verifier 83 may read the synthesis message more times than the number of times the verifier 83 reads the vehicle message, and perform verification. When, for example, messages are stored in both the first storage 85 and the second storage 86, the verifier 83 may read the vehicle message from the second storage 86 once so long as it reads synthesis messages N consecutive times (where N is an integer larger than or equal to two) from the first storage 85.

With this configuration, the verifier 83 can prioritize performing such verification processing that can acquire two or more pieces of vehicle information in one operation. Thus, the verifier 83 can efficiently perform the verification processing.

The verifier 83 may not perform verification on a message that was received more than a predetermined time ago. For example, the message storage 82 may delete a message that was written therein more than a certain time ago. This configuration eliminates the need for the verifier 83 to perform verification processing on the synthesis information or the vehicle information representing a state that differs from the current state. Thus, the verifier 83 can efficiently perform the verification processing.

The mapping generator 84 acquires synthesis information verified as valid or vehicle information verified as valid from the verifier 83. The mapping generator 84 generates mapping information representing, for example, the vehicle body size, relative position to the device-installed vehicle, moving direction, and transmitting time of the source vehicle information of each of the one or more vehicles 20 present therearound, on the basis of the synthesis information verified as valid. The mapping generator 84 generates the mapping information on the basis of the vehicle information verified as valid. In a case where the mapping generator 84 has already generated the mapping information and then acquires new synthesis information or vehicle information, the mapping generator 84 updates a portion of the mapping information corresponding to the newly acquired synthesis information or vehicle information on the basis of the newly acquired synthesis information or vehicle information.

When the mapping generator 84 acquires vehicle information on the same vehicle 20 two or more times, the mapping generator 84 generates or updates a portion of the mapping information corresponding to this vehicle 20 on the basis of the vehicle information having the latest transmitting time. Even when the mapping generator 84 acquires vehicle information on the same vehicle 20 two or more times, this configuration can prevent the mapping generator 84 from updating the mapping information on the basis of the old vehicle information or updating the mapping information again on the basis of two or more pieces of vehicle information having the same transmitting time.

The mapping generator 84 includes, for example, a mapping storage 90, a selector 91, an extractor 92, a duplication eliminator 93, a mapping processor 94, and a mapping output unit 95. The mapping storage 90 stores therein the latest mapping information.

The selector 91 acquires the synthesis information or the vehicle information from the verifier 83. The selector 91 provides the synthesis information to the extractor 92 and the vehicle information to the duplication eliminator 93.

The extractor 92 extracts, from the synthesis information, one or more pieces of vehicle information included therein. When, for example, the synthesis information is information made of two or more pieces of vehicle information that are concatenated together, the extractor 92 separates the synthesis information into two or more pieces of vehicle information. The extractor 92 provides one or more pieces of vehicle information extracted from the synthesis information to the duplication eliminator 93.

The duplication eliminator 93 acquires vehicle information from the selector 91 and the extractor 92. The duplication eliminator 93 determines whether the transmitting time, included in the mapping information, of the source vehicle information of the vehicle 20 corresponding to the newly acquired vehicle information is identical to or later than the transmitting time of the newly acquired vehicle information. When the transmitting time, in the mapping information, of the source vehicle information of the corresponding vehicle 20 is identical to or later than the transmitting time of the newly acquired vehicle information, the duplication eliminator 93 deletes the newly acquired vehicle information. When the transmitting time, in the mapping information, of the source vehicle information of the corresponding vehicle 20 is earlier than the transmitting time of the newly acquired vehicle information, the duplication eliminator 93 provides the newly acquired vehicle information to the mapping processor 94. This configuration can prevent the duplication eliminator 93 from updating the mapping information again on the basis of the vehicle information on the same vehicle 20 having the same or previous transmitting time.

The mapping processor 94 acquires vehicle information from the duplication eliminator 93. The mapping processor 94 updates information (for example, the vehicle body size, relative position to the device-installed vehicle, moving direction, and transmitting time of the source vehicle information of the vehicle 20 corresponding to the newly acquired vehicle information) corresponding to the newly acquired vehicle information in the mapping information stored in the mapping storage 90 on the basis of the newly acquired vehicle information.

When the mapping information is updated, the mapping output unit 95 provides the updated mapping information to the analyzer 54. The mapping output unit 95 may provide the mapping information stored in the mapping storage 90 to the analyzer 54 upon reception of an acquisition request from the analyzer 54.

Figure 7:
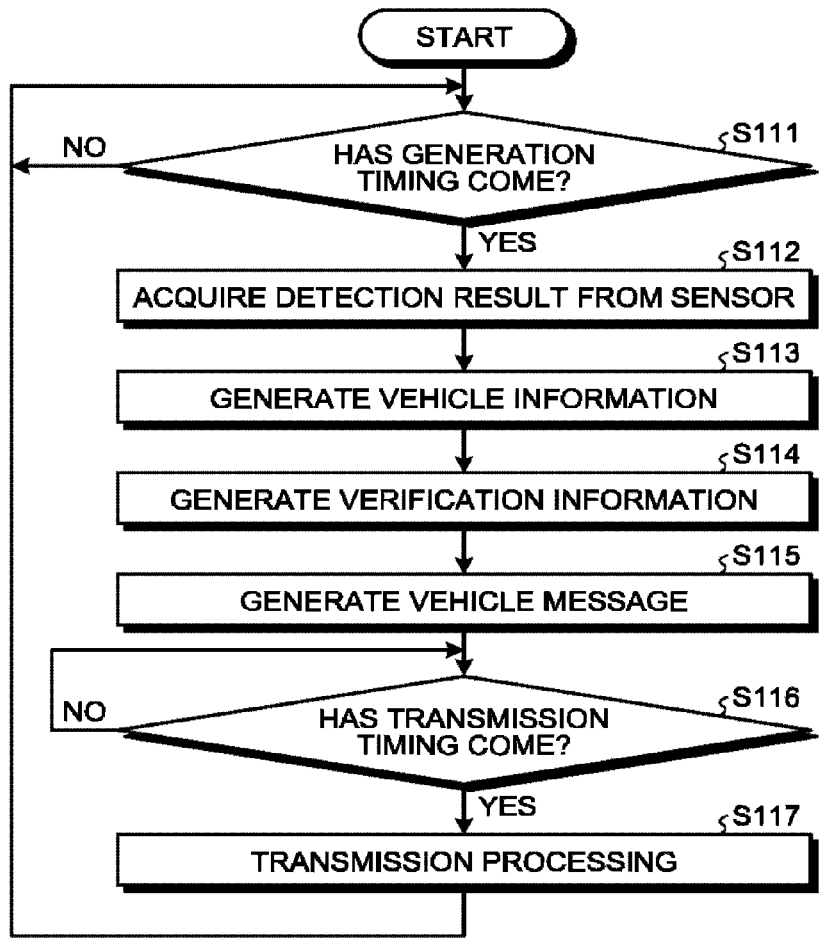
FIG. 7 is a flowchart illustrating transmission processing performed by the vehicle communication device.

FIG. 7 is a flowchart illustrating transmission processing performed by the vehicle communication device 22. The vehicle communication device 22 performs the transmission processing in accordance with the procedure illustrated in FIG. 7 after, for example, driving is started.

At S111, the vehicle communication device 22 determines whether a generation timing of the vehicle message has come. The generation timing comes, for example, a first predetermined time before the transmission timing of the vehicle message. If the vehicle communication device 22 determines that the generation timing of the vehicle message has come (Yes at S111), the process proceeds to S112, and if not (No at S111), the process remains at S111.

At S112, the vehicle communication device 22 acquires the detection result of the sensor 45. At S113, the vehicle communication device 22 generates vehicle information. At S114, the vehicle communication device 22 generates verification information (first verification information) indicative of the validity of the generated vehicle information. At S115, the vehicle communication device 22 generates a vehicle message including the generated vehicle information and the generated verification information (first verification information).

At S116, the vehicle communication device 22 determines whether a transmission timing of the vehicle message has come. The transmission timing is specified at, for example, predetermined transmission intervals, such as every 100 ms. If the vehicle communication device 22 determines that the transmission timing has come (Yes at S116), the process proceeds to S117, and if not (No at S116), the process remains at S116.

At S117, the vehicle communication device 22 performs transmission processing of the generated vehicle message. The vehicle communication device 22 returns the process to S111. Thus, the vehicle communication device 22 can transmit the vehicle message to the roadside device 30 and the vehicles 20 therearound at predetermined transmission intervals.

Figure 8:
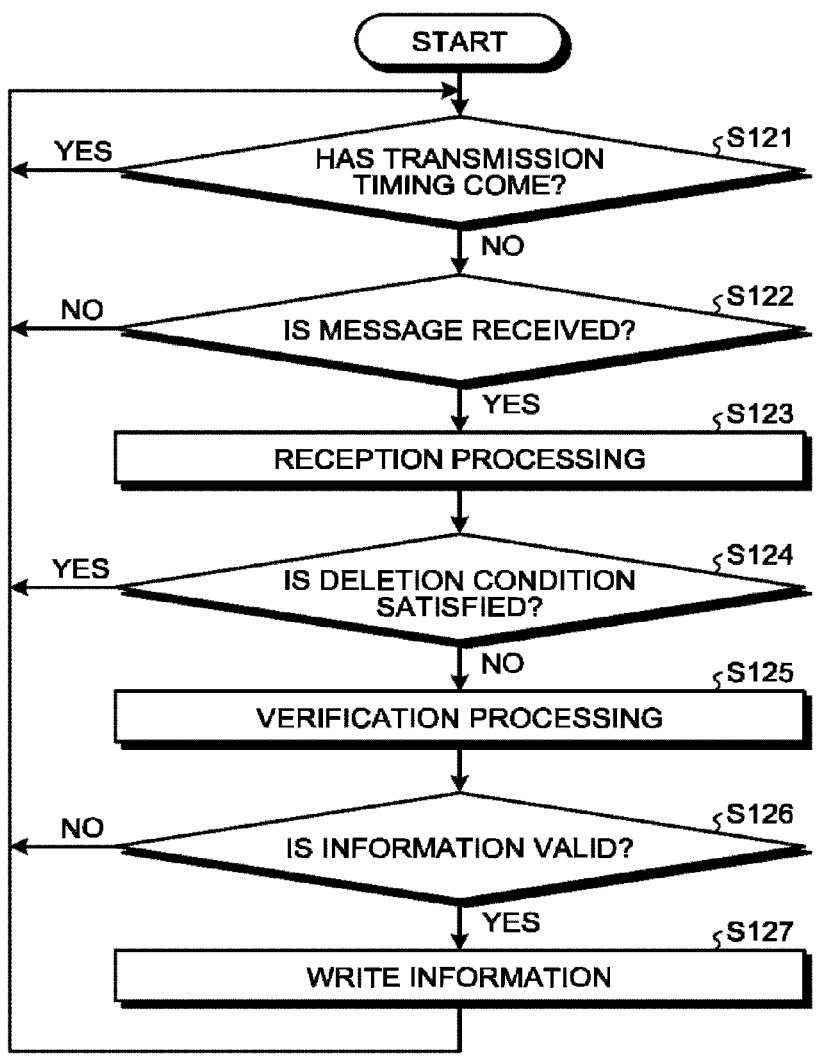
FIG. 8 is a flowchart illustrating reception processing performed by the roadside communication device.

FIG. 8 is a flowchart illustrating reception processing performed by the roadside communication device 32. The roadside communication device 32 performs the reception processing in accordance with the procedure illustrated in FIG. 8 after being installed in a certain location.

At S121, the roadside communication device 32 determines whether a transmission timing of the synthesis message has come. The transmission timing is specified at, for example, predetermined transmission intervals. At the transmission timing, the roadside communication device 32 cannot receive any vehicle message. If the roadside communication device 32 determines that the transmission timing of the synthesis message has not come yet (No at S121), the process proceeds to S122, and if determining that the transmission timing has come (Yes at S121), the process remains at S121.

At S122, the roadside communication device 32 determines whether a vehicle message is received. If the roadside communication device 32 determines that the vehicle message is received (Yes at S122), the process proceeds to S123, and if not (No at S122), the process returns to S121.

At S123, the roadside communication device 32 performs reception processing of the vehicle message. At S124, the roadside communication device 32 determines whether the received vehicle message satisfies a predetermined deletion condition. The predetermined deletion condition is such that, for example, the received vehicle message is a vehicle message transmitted from a vehicle 2C further away than a predetermined distance. The deletion condition may be such that the received vehicle message is a vehicle message transmitted from a vehicle 20 that has transmitted invalid vehicle information a predetermined time before to the present. The deletion condition may be such that the received vehicle message has an unusual value among values included in the vehicle information. The deletion condition may be such that the received vehicle message is a vehicle message transmitted from a vehicle 20 that has transmitted vehicle information having an unusual value a predetermined time before to the present.

If the roadside communication device 32 determines that the received vehicle message satisfies the deletion condition (Yes at S124), the process returns to S121. With this configuration, the roadside communication device 32 can delete the received vehicle message without performing processing on the received message. If the roadside communication device 32 determines that the received vehicle message fails to satisfy the deletion condition (No at S124), the process proceeds to S125.

At S125, the roadside communication device 32 verifies the validity of the vehicle information included in the received vehicle message on the basis of the verification information included in the received vehicle message. At S126, the roadside communication device 32 determines whether the vehicle information is valid. If the roadside communication device 32 determines that the vehicle information is invalid (No at S126), the process returns to S121. If the roadside communication device 32 determines that the vehicle information is valid (Yes at S126), the process proceeds to S127.

At S127, the roadside communication device 32 writes the vehicle information in the vehicle information storage 70. The roadside communication device 32 then performs the process of S121 again. Thus, the roadside communication device 32 can receive vehicle information from vehicles 20 therearound in a period other than the transmission timing. The roadside communication device 32 can store, in the vehicle information storage 70, the vehicle information that satisfies no deletion condition and is verified as valid.

Figure 9:
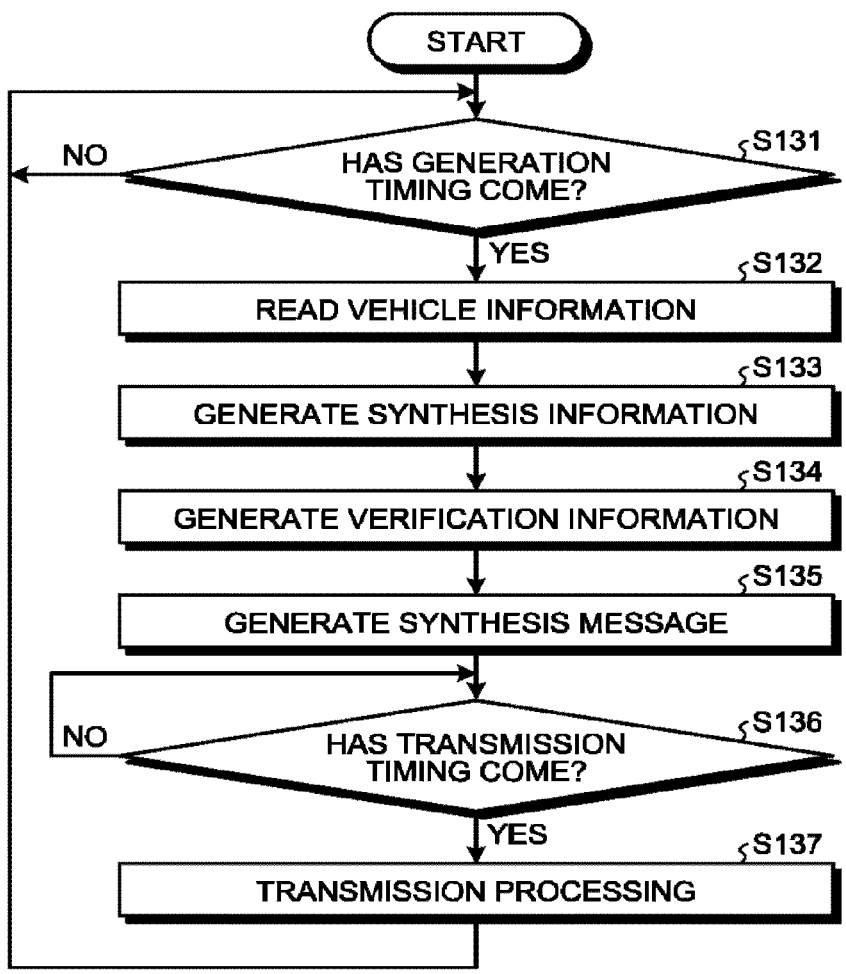
FIG. 9 is a flowchart illustrating transmission processing performed by the roadside communication device.

FIG. 9 is a flowchart illustrating transmission processing performed by the roadside communication device 32. The roadside communication device 32 performs the transmission processing in accordance with the procedure illustrated in FIG. 9 after being installed in a certain location.

At S131, the roadside communication device 32 determines whether a generation timing of the synthesis message has come. The generation timing comes, for example, a second predetermined time before the transmission timing of the synthesis message. If the roadside communication device 32 determines that the generation timing of the synthesis message has come (Yes at S131), the process proceeds to S132, and if not (No at S131), the process remains at S131.

At S132, the roadside communication device 32 reads one or more pieces of vehicle information stored in the vehicle information storage 70. The roadside communication device 32 reads, from the vehicle information storage 70, one or more pieces of vehicle information that were not included in the synthesis message transmitted in the past.

At S133, the roadside communication device 32 generates synthesis information on the basis of the read one or more pieces of vehicle information. For example, the roadside communication device 32 generates the synthesis information by concatenating the read one or more pieces of vehicle information.

At S134, the roadside communication device 32 generates verification information (second verification information) indicative of the validity of the generated synthesis information. At S135, the roadside communication device 32 generates a synthesis message including the generated synthesis information and the generated verification information (second verification information).

At S136, the roadside communication device 32 determines whether a transmission timing of the synthesis message has come. The transmission timing is specified at, for example, predetermined transmission intervals. If the roadside communication device 32 determines that the transmission timing has come (Yes at S136), the process proceeds to S137, and if not (No at S136), the process remains at S136.

At S137, the roadside communication device 32 performs transmission processing of the generated synthesis message. The roadside communication device 32 returns the process to S131. Thus, the roadside communication device 32 can transmit the synthesis message to the vehicles 20 therearound at predetermined transmission intervals.

Figure 10:
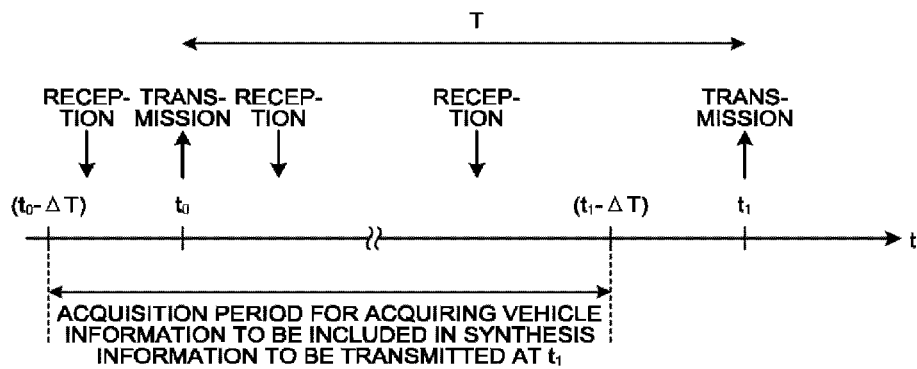
FIG. 10 is a diagram illustrating an acquisition period for acquiring vehicle information.

FIG. 10 is a diagram illustrating an acquisition period of vehicle information. The roadside communication device 32 transmits a synthesis message, for example, every T second. At time $t_0$, for example, the roadside communication device 32 transmits a synthesis message, and at time $t_1$, which is T seconds after time $t_0$, the roadside communication device 32 transmits the next synthesis message. The total time (second predetermined time) needed for a process of reading the vehicle information from the vehicle information storage 70, a process of generating synthesis information from one or more pieces of vehicle information, a process of generating verification information, a process of generating a synthesis message, and a process of transmitting the synthesis message performed by the roadside communication device 32 is $\Delta T$.

In this case, the roadside communication device 32 reads, from the vehicle information storage 70, one or more pieces of vehicle information acquired in a period from time $(t_0-\Delta T)$ obtained by subtracting $\Delta T$ from time $t_0$ to time $(t_1-\Delta T)$ obtained by subtracting $\Delta T$ from time $t_1$. The roadside communication device 32 transmits the synthesis message generated on the basis of the read one or more pieces of vehicle information at time $t_1$. With this configuration, the roadside communication device 32 can transmit a synthesis message every T second.

Figure 11:
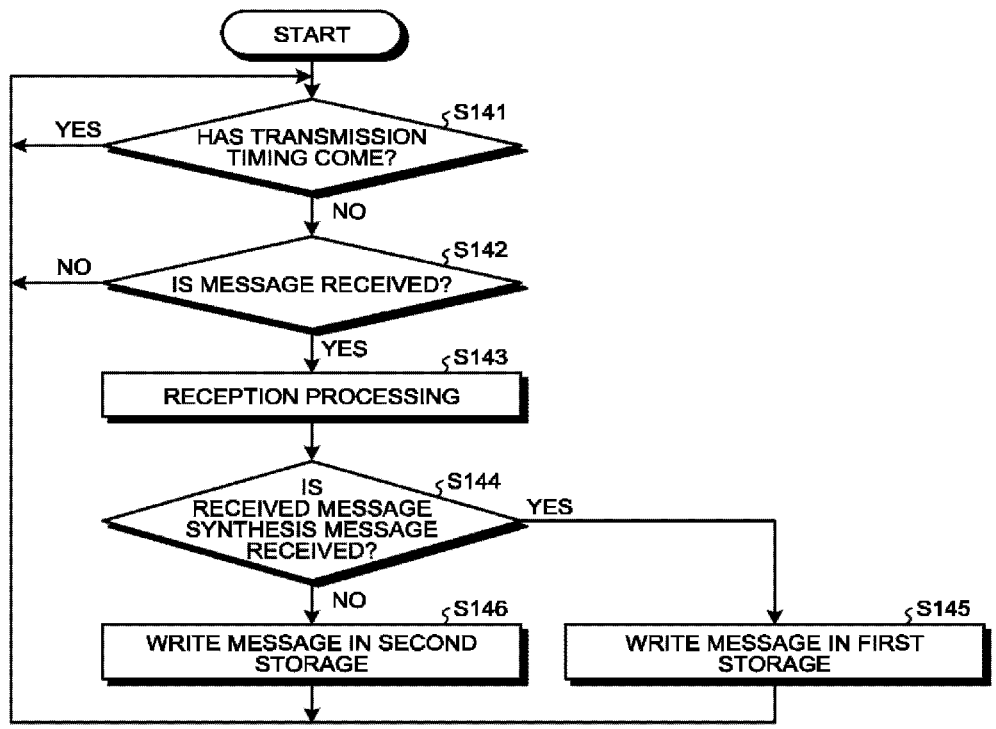
FIG. 11 is a flowchart illustrating reception processing performed by the vehicle communication device.

FIG. 11 is a flowchart illustrating reception processing performed by the vehicle communication device 22. The vehicle communication device 22 performs the reception processing in accordance with the procedure illustrated in FIG. 11 after, for example, driving is started.

At S141, the vehicle communication device 22 determines whether a transmission timing of the vehicle message has come. The transmission timing is specified at, for example, predetermined transmission intervals. At the transmission timing, the vehicle communication device 22 cannot receive any message. If the vehicle communication device 22 determines that the transmission timing of the vehicle message has not come yet (No at S141), the process proceeds to S142, and if determining that the transmission timing has come (Yes at S141), the process remains at S141.

At S142, the vehicle communication device 22 determines whether a message is received. If the vehicle communication device 22 determines that a message is received (Yes at S142), the process proceeds to S143, and if not (No at S142), the process returns to S141.

At S143, the vehicle communication device 22 performs reception processing of the message. At S144, the vehicle communication device 22 determines whether the received message is a synthesis message. If the vehicle communication device 22 determines that the received message is a synthesis message (Yes at S144), the process proceeds to S145. If the vehicle communication device 22 determines that the received message is not a synthesis message (No at S144), that is, if the received message is a vehicle message, the process proceeds to S146.

At S145, the vehicle communication device 22 writes the synthesis message in the first storage 85 of the message storage 82. At S146, the vehicle communication device 22 writes the vehicle message in the second storage 86 of the message storage 82. After S145 or S146, the vehicle communication device 22 returns the process to S141.

Thus, the vehicle communication device 22 can receive the synthesis message and the vehicle message from the roadside device 30 therearound or the vehicles 20 therearound in a period other than the transmission timing. The vehicle communication device 22 can write the synthesis message in the first storage 85 and write the vehicle message in the second storage 86.

Figure 12:
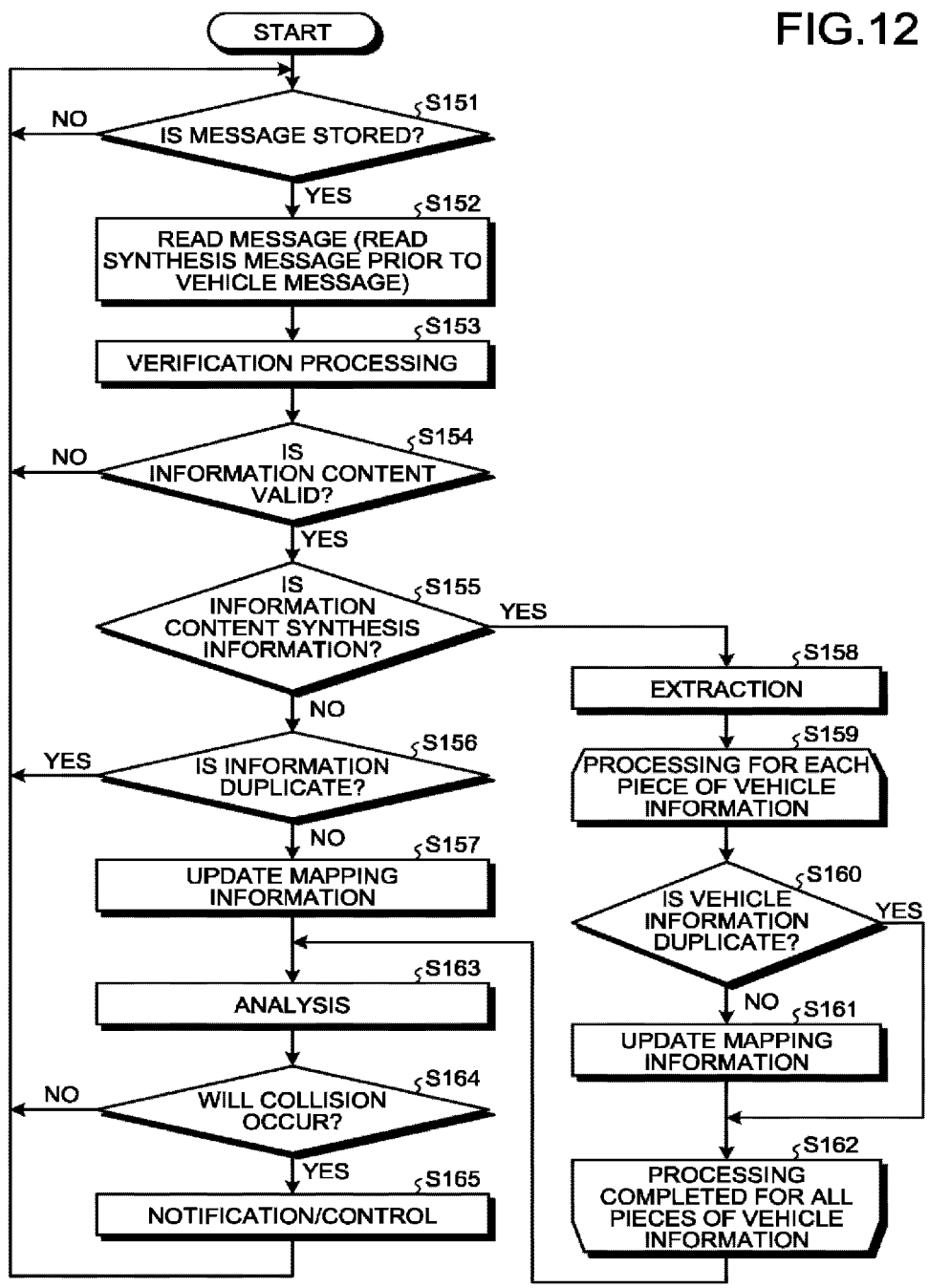
FIG. 12 is a flowchart illustrating processing after reception performed by the vehicle communication device according to the first embodiment.

FIG. 12 is a flowchart illustrating processing after the reception of the message according to the first embodiment. The vehicle communication device 22 performs the processing in accordance with the procedure illustrated in FIG. 12 in parallel with the reception processing after, for example, driving is started.

At S151, the vehicle communication device 22 determines whether at least one message is stored in the message storage 82. If the vehicle communication device 22 determines that at least one message is stored (Yes at S151), the process proceeds to S152, and if no message is stored (No at S151), the process remains at S151.

At S152, the vehicle communication device 22 reads the synthesis message and the vehicle message from the message storage 82 one by one. In this case, the vehicle communication device 22 prioritizes reading the synthesis message over reading the vehicle message.

When, for example, at least one synthesis message is stored in the first storage 85, the vehicle communication device 22 reads the synthesis message. Subsequently, the vehicle communication device 22 reads the vehicle message from the second storage 86, provided that no synthesis message is stored in the first storage 85. When messages are stored in both the first storage 85 and the second storage 86, the vehicle communication device 22 may read the vehicle message from the second storage 86 once so long as the vehicle communication device 22 reads the synthesis messages N consecutive times (where N is an integer larger than or equal to two) from the first storage 85.

At S153, the vehicle communication device 22 verifies the information content (synthesis information or vehicle information) included in the read message on the basis of the verification information included in the read message. At S154, the vehicle communication device 22 determines whether the information content included in the message is valid. If the vehicle communication device 22 determines that the information content is invalid (No at S154), the process returns to S151. If the vehicle communication device 22 determines that the information content is valid (Yes at S154), the process proceeds to S155.

At S155, the vehicle communication device 22 determines whether the verified information content is synthesis information. If the vehicle communication device 22 determines that the verified information content is not the synthesis information (No at S155), that is, when the verified information content is vehicle information, the process proceeds to S156. If the vehicle communication device 22 determines that the verified information content is synthesis information (Yes at S155), the process proceeds to S158.

At S156, the vehicle communication device 22 determines whether the newly acquired vehicle information is duplicate information to the vehicle information that has already been acquired. In other words, when the transmitting time, included in the mapping information, of the source vehicle information of an information portion corresponding to the newly acquired vehicle information is identical to or later than the transmitting time of the newly acquired vehicle information, the vehicle communication device 22 determines that the newly acquired vehicle information is duplicate information to the already acquired vehicle information. If the vehicle communication device 22 determines that the newly acquired vehicle information is duplicate information to the already acquired vehicle information (Yes at S156), the process returns to S151. If the vehicle communication device 22 determines that the newly acquired vehicle information is not duplicate information to the already acquired vehicle information (No at S156), the process proceeds to S157.

At S157, the vehicle communication device 22 updates information (e.g., the vehicle body size, relative position to the device-installed vehicle, moving direction, and transmitting time of the source vehicle information) about the vehicle 20 corresponding to the newly acquired vehicle information in the mapping information on the basis of the newly acquired vehicle information. When the information on the corresponding vehicle 20 is not included in the mapping information yet, the vehicle communication device 22 newly generates information about the corresponding vehicle 20 in the mapping information. After S157, the vehicle communication device 22 performs the process of S163.

At S158, the vehicle communication device 22 extracts, from the acquired synthesis information, one or more pieces of vehicle information included in the acquired synthesis information. When, for example, the synthesis information is information made of two or more pieces of vehicle information that are concatenated together, the vehicle communication device 22 separates the synthesis information into two or more pieces of vehicle information.

After S158, the vehicle communication device 22 performs loop processing from S159 to S162 for each piece of vehicle information extracted from the synthesis information.

At S160 in the loop processing, the vehicle communication device 22 determines whether the extracted vehicle information is duplicate information to the vehicle information that has already been acquired. The process of S160 is the same as that of S156. If the vehicle communication device 22 determines that the extracted vehicle information is duplicate information to the already acquired vehicle information (Yes at S160), the process proceeds to S162. If the vehicle communication device 22 determines that the extracted vehicle information is not duplicate information to the already acquired vehicle information (No at S160), the process proceeds to S161.

At S161 in the loop processing, the vehicle communication device 22 updates information about the corresponding vehicle 20 in the mapping information on the basis of the extracted vehicle information. The process of S161 is the same as that of S157. After S161, the vehicle communication device 22 performs the process of S162.

At S162, the vehicle communication device 22 determines whether the processing has been performed on all the pieces of vehicle information extracted from the synthesis information. When the vehicle communication device 22 finishes the processing from 159 to S162 for all the pieces of vehicle information, the loop is exited and the process proceeds to S163.

At S163, the vehicle communication device 22 analyses, for example, a possibility that the device-installed vehicle and another of the vehicles will have a collision on the basis of the mapping information. The vehicle communication device 22 analyses, for example, a probability of collision, predicted time of collision, and a contact position in collision.

At S164, the vehicle communication device 22 determines whether the device-installed vehicle and another of the vehicles have a collision. At S164, for example, the vehicle communication device 22 may determine whether the probability of collision is equal to or higher than a certain value. If the vehicle communication device 22 determines that the device-installed vehicle and another of the vehicles are not going to have a collision (No at S164), the process returns to S151. If the vehicle communication device 22 determines that the device-installed vehicle and another of the vehicles are going to have a collision (Yes at S164), the process proceeds to S165.

At S165, the vehicle communication device 22 notifies the driver of the analysis result, or controls the motion of the vehicle 20 to avoid collision, for example. After S165, the vehicle communication device 22 returns the process to S151.

As described above, the roadside communication device 32 generates the synthesis information on the basis of two or more pieces of vehicle information received from the vehicles 20 therearound, and transmits a synthesis message including the synthesis information and the verification information to each of the vehicles 20 therearound. The vehicle communication device 22 verifies the synthesis information generated on the basis of two or more pieces of vehicle information and acquires the two or more pieces of vehicle information. The driving assistance communication system 10, as described above, enables the vehicle communication device 22 to acquire two or more pieces of vehicle information in one operation of the verification processing. This configuration can reduce the load on the verification processing of the vehicle communication device 22.

First Modification

Figure 13:
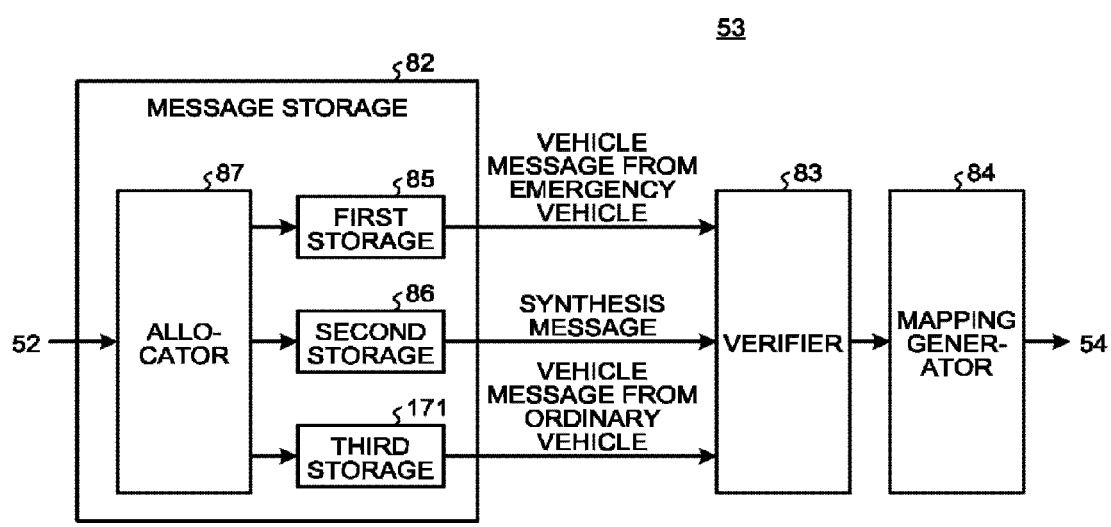
FIG. 13 is a diagram illustrating a functional configuration of the message processor according to a first modification of the first embodiment.

FIG. 13 is a diagram illustrating a functional configuration of the message processor 53 according to a first modification of the first embodiment. The verifier 83 according to the first modification of the first embodiment prioritizes verifying the vehicle information included in a vehicle message transmitted from an emergency vehicle over verifying the vehicle information included in a vehicle message transmitted from a vehicle 20 other than the emergency vehicle.

The emergency vehicle is a vehicle 20 for use in, for example, lifesaving and fire-extinguishing operations that require immediate actions. Examples of the emergency vehicle include an ambulance, a fire engine, and a police car.

The verifier 83 according to the first modification may prioritize verifying the vehicle message transmitted from an emergency vehicle over verifying the synthesis message. For example, the message storage 82 further includes a third storage 171. The first storage 85 according to the first modification stores therein a vehicle message transmitted from the emergency vehicle. The second storage 86 according to the first modification stores therein the synthesis message. The third storage 171 stores therein vehicle messages transmitted from ordinary vehicles 20 other than the emergency vehicle. The allocator 87 refers to the identification information included in a message and writes the acquired message in any one of the first storage 85, the second storage 86, and the third storage 171.

When a vehicle message is stored in the first storage 85, the verifier 83 prioritizes reading the vehicle message from the first storage 85 and verifying the vehicle information. The verifier 83 reads a message from the second storage 86 or the third storage 171 provided that no vehicle message is stored in the first storage 85, and verifies the information included in the message. In this case, the verifier 83 prefers verifying the synthesis message stored in the second storage 86 over verifying the vehicle message stored in the third storage 171.

The verifier 83 may prioritize verifying the vehicle information included in a vehicle message transmitted from a vehicle 20 inside a first area over verifying the vehicle information included in a vehicle message transmitted from a vehicle 20 outside of the first area. The first area is an area defined by a predetermined distance from the device-installed vehicle. For example, the first storage 85 further stores therein a vehicle message transmitted from a vehicle 20 at a predetermined distance or less from the device-installed vehicle. The allocator 87 compares the position included in the message with the current position of the device-installed vehicle, and writes the acquired vehicle message in the first storage 85 or the third storage 171.

With this configuration, the vehicle communication device 22 according to the first modification can immediately notify the driver of a presence of an emergency vehicle, or can cause the device-installed vehicle to move in such a direction that can avoid the emergency vehicle. The vehicle communication device 22 according to the first modification can immediately notify the driver of a presence of a vehicle 20 at a predetermined distance or less from the device-installed vehicle, or can cause the device-installed vehicle to move in such a direction that can avoid the vehicle 20 at the predetermined distance or less therefrom.

Second Modification

Figure 14:
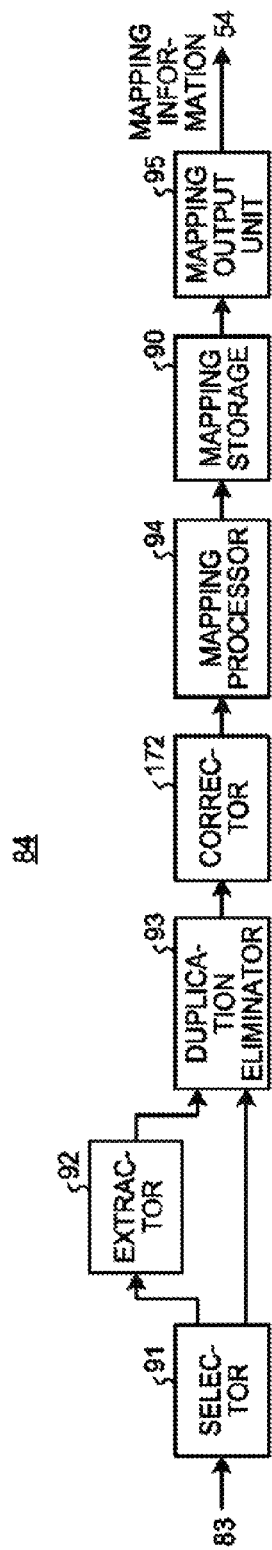
FIG. 14 is a diagram illustrating a functional configuration of a mapping generator according to a second modification of the first embodiment.

FIG. 14 is a diagram illustrating a functional configuration of the mapping generator 84 according to a second modification of the first embodiment. The mapping generator 84 according to the second modification of the first embodiment corrects each piece of vehicle information included in the synthesis information according to an elapsed time from a transmitting time to the current time and generates the mapping information on the basis of corrected vehicle information.

For example, the mapping generator 84 according to the second modification of the first embodiment further includes a corrector 172. The corrector 172 acquires, from the duplication eliminator 93, vehicle information from which duplications have been eliminated.

The corrector 172 selects vehicle information extracted from the synthesis information. The corrector 172 calculates, for the selected vehicle information, an elapsed time to the transmitting time included in the vehicle information from the current time. The corrector 172 calculates, for the selected vehicle information, a moving direction on the basis of the orientation and the steering angle included in the selected vehicle information. The corrector 172 calculates a predicted position at the current time on the basis of the position, elapsed time, moving direction, and velocity included in the selected vehicle information. The corrector 172 corrects the position included in the selected vehicle information to the predicted position. The corrector 172 then provides the corrected vehicle information to the mapping processor 94.

With this configuration, the mapping generator 84 can correct the delay of the vehicle information through the roadside device 30, and thus can generate accurate mapping information.

The corrector 172 may correct the vehicle information included in a vehicle message directly received from a vehicle 20 in the same manner. With this configuration, the corrector 172 can correct the delay of the vehicle information caused by prioritizing correction on the synthesis information, and thus can generate accurate mapping information.

Second Embodiment

Figure 15:
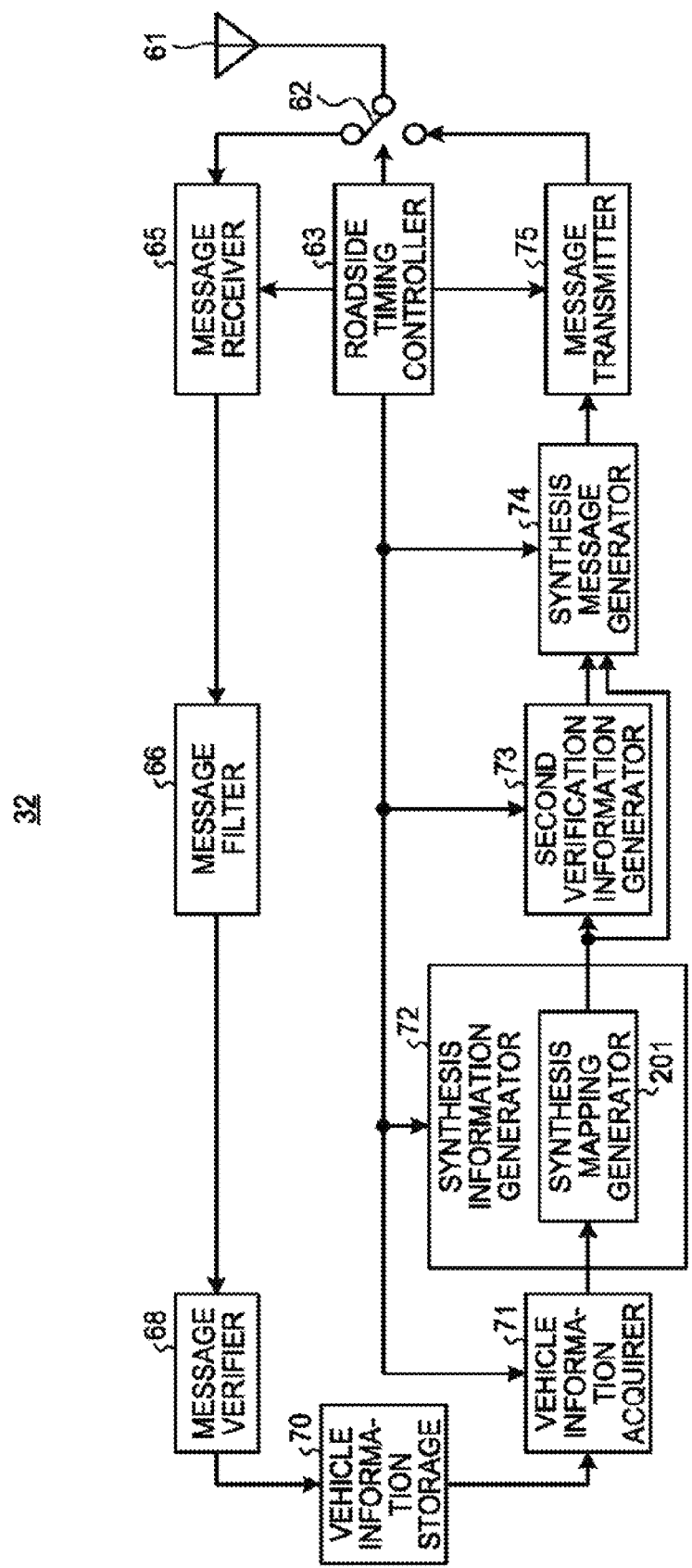
FIG. 15 is a diagram illustrating a functional configuration of a roadside communication device according to a second embodiment.

FIG. 15 is a diagram illustrating a functional configuration of the roadside communication device 32 according to a second embodiment. The roadside communication device 32 according to the second embodiment includes a synthesis mapping generator 201 in the synthesis information generator 72.

The synthesis mapping generator 201 generates synthesis mapping information representing the vehicle body size, position, moving direction, and transmitting time of the source vehicle information of each of the one or more vehicles 20 on the basis of the one or more pieces of vehicle information read by the vehicle information acquirer 71 and verified as valid. The synthesis mapping generator 201 generates synthesis information including the synthesis mapping information.

Figure 16:
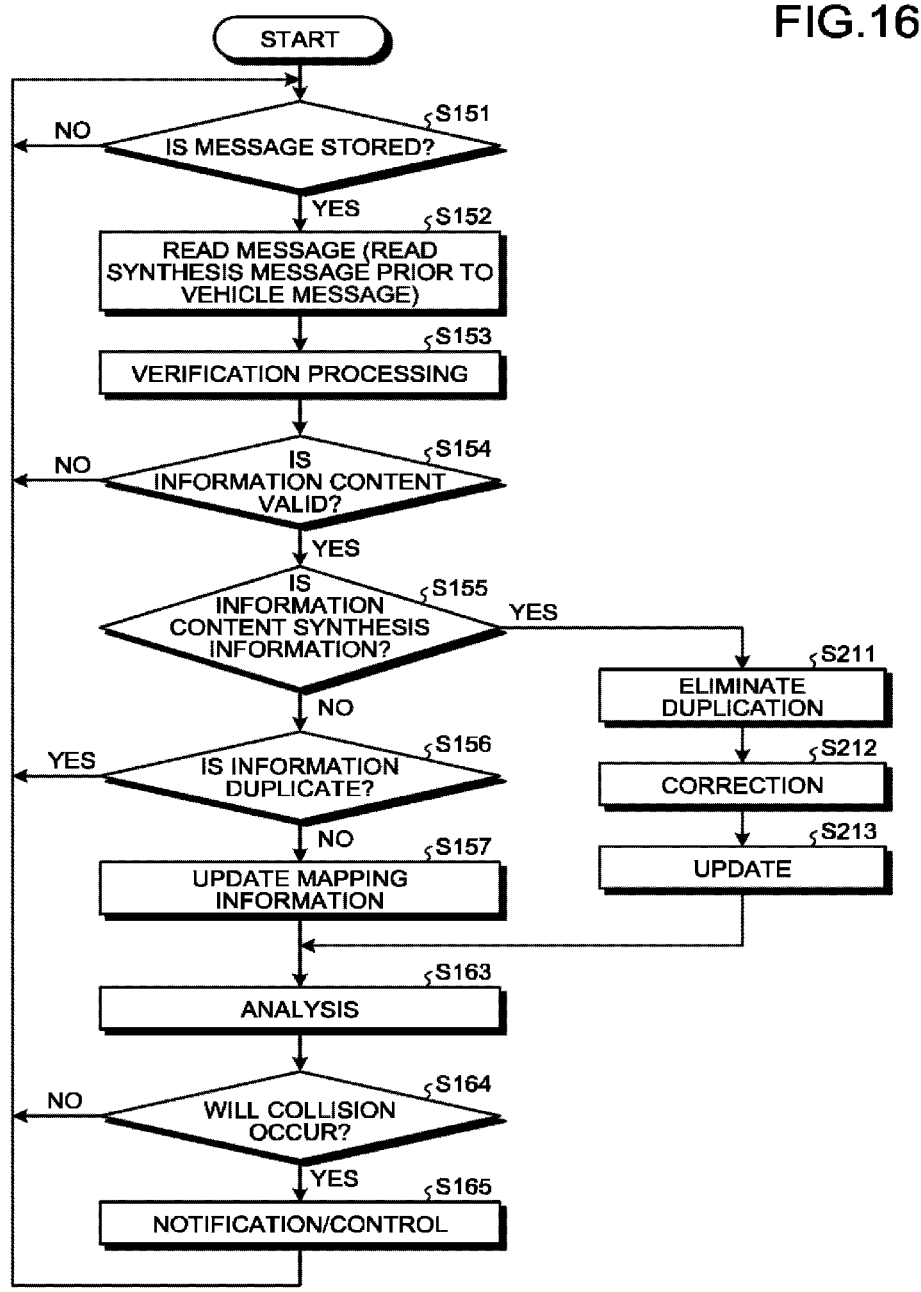
FIG. 16 is a flowchart illustrating processing after reception performed by a vehicle communication device according to the second embodiment.

FIG. 16 is a flowchart illustrating processing performed by the vehicle communication device 22 according to the second embodiment after the reception of the message. In the second embodiment, the vehicle communication device 22 performs the processing in parallel with the reception processing in accordance with the procedure illustrated in FIG. 16.

The flowchart illustrated in FIG. 16 includes processes from S211 to S213 instead of the processes from S158 to S162 in FIG. 12. Described below are differences between the procedure of FIG. 12 and that of FIG. 16 with reference to FIG. 16.

If the vehicle communication device 22 determines that the acquired information content is synthesis information at S155 (Yes at S155), the process proceeds to S211. At S211, the vehicle communication device 22 extracts the synthesis mapping information included in the synthesis information. The vehicle communication device 22 eliminates information from information on each of the vehicles 20 included in the synthesis mapping information, the information that the already acquired vehicle information indicates.

In other words, when the transmitting time of the already acquired vehicle information about a vehicle 20 is identical to or later than the transmitting time included in the information about the corresponding vehicle 20 in the synthesis mapping information, the vehicle communication device 22 determines that the information is duplicate information. The vehicle communication device 22 performs this determination processing on the information of the respective vehicles 20 included in the synthesis mapping information. The vehicle communication device 22 eliminates information that is determined to be duplicate from the information of the vehicles 20 included in the synthesis mapping information.

At S212, the vehicle communication device 22 corrects the position of each of the vehicles 20 included in the synthesis mapping information from which duplications have been eliminated to the relative position to the device-installed vehicle. At S213, the vehicle communication device 22 updates the mapping information that the vehicle communication device 22 manages according to the vehicle body size, position, moving direction, and transmitting time of each of the vehicles 20 included in the corrected synthesis mapping information. After S213, the vehicle communication device 22 performs the process of S163.

As described above, the vehicle communication device 22 according to the second embodiment receives the synthesis mapping information from the roadside communication device 32 and updates the mapping information that the vehicle communication device 22 manages. This configuration eliminates the need for the vehicle communication device 22 to extract vehicle information from synthesis information, thereby reducing the process performed by the vehicle communication device 22.

Third Embodiment

Figure 17:
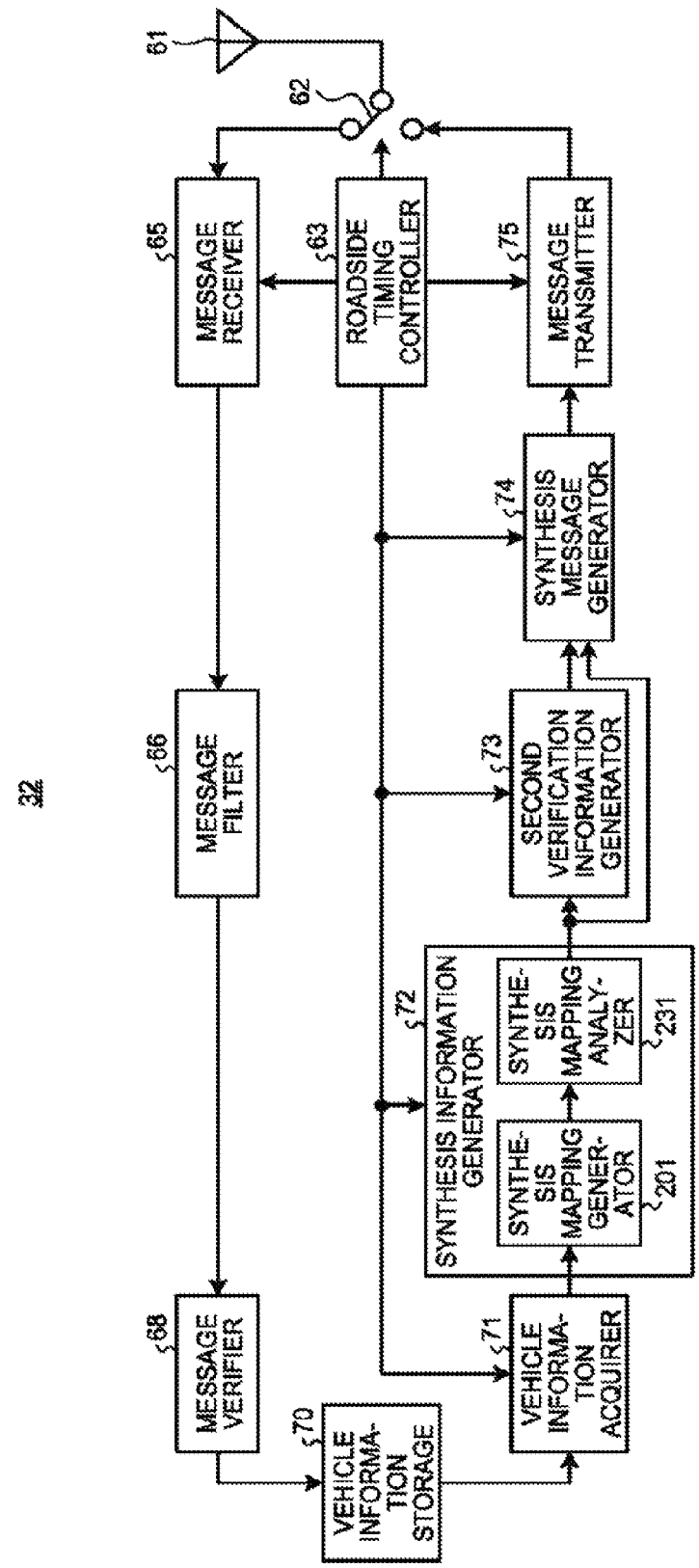
FIG. 17 is a diagram illustrating a functional configuration of a roadside communication device according to a third embodiment.

FIG. 17 is a diagram illustrating a functional configuration of the roadside communication device 32 according to a third embodiment. The roadside communication device 32 according to the third embodiment includes the synthesis mapping generator 201 and a synthesis mapping analyzer 231 in the synthesis information generator 72.

The synthesis mapping generator 201 provides generated synthesis mapping information to the synthesis mapping analyzer 231. The synthesis mapping analyzer 231 acquires synthesis mapping information from the synthesis mapping generator 201.

The synthesis mapping analyzer 231 analyzes a collision possibility among two or more vehicles 20 on the basis of the acquired synthesis mapping information. The synthesis mapping analyzer 231 analyzes, for example, a probability of collision, predicted time of collision, and a contact position in collision among two or more vehicles 20. The synthesis mapping analyzer 231 generates collision possibility information that represents the analysis result. The synthesis mapping analyzer 231 generates synthesis information including the collision possibility information.

Figure 18:
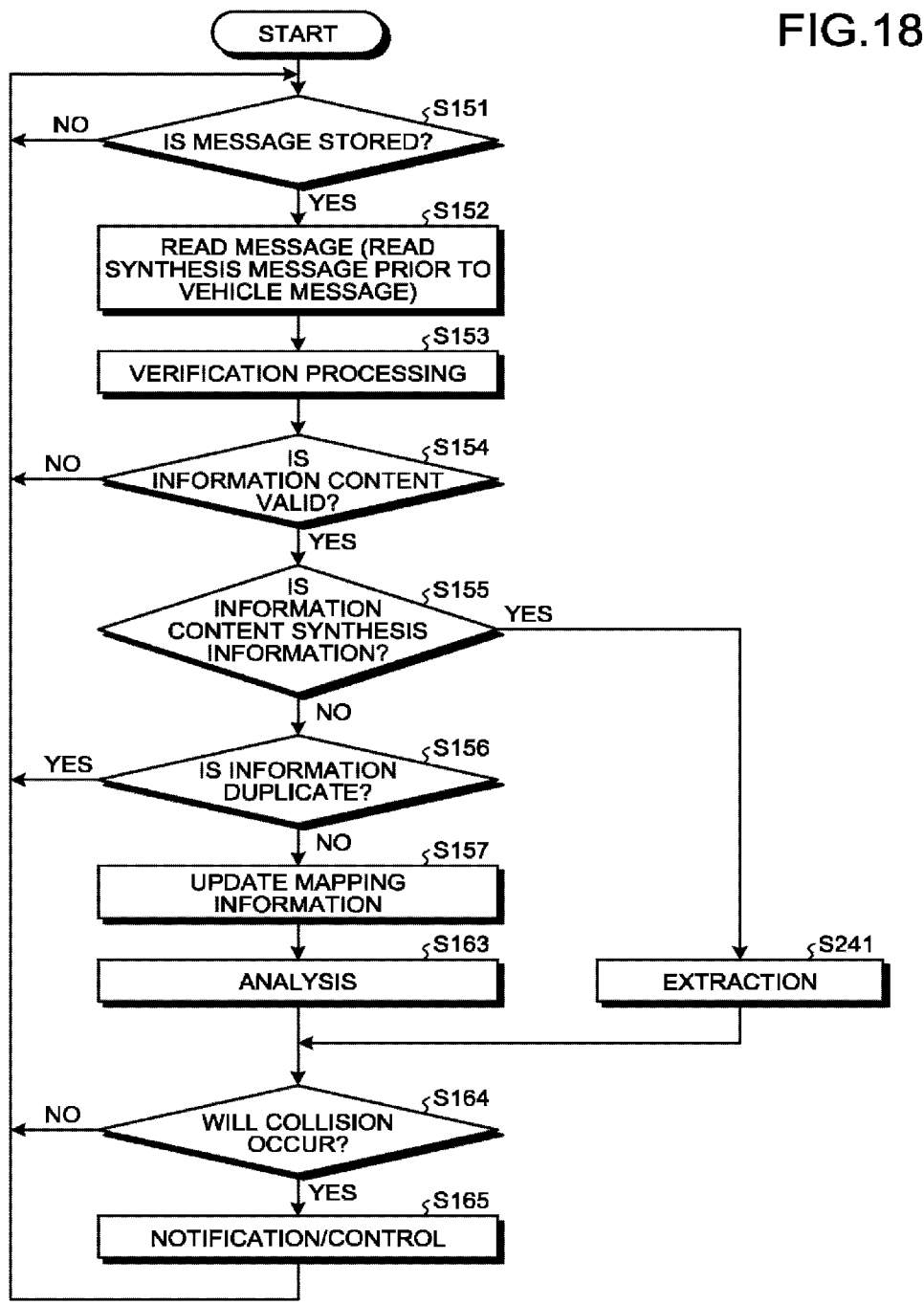
FIG. 18 is a flowchart illustrating processing after reception performed by a vehicle communication device according to the third embodiment.

FIG. 18 is a flowchart illustrating processing performed by the vehicle communication device 22 according to the third embodiment after the reception of the message. In the third embodiment, the vehicle communication device 22 performs the processing in parallel with the reception processing in accordance with the procedure illustrated in FIG. 18.

The flowchart illustrated in FIG. 18 includes a process of S241 instead of the processes from S158 to S162 in FIG. 12. Described below are differences between the procedure of FIG. 12 and that of FIG. 18 with reference to FIG. 18.

If the vehicle communication device 22 determines that the acquired information content is synthesis information at S155 (Yes at S155), the process proceeds to S241. At S241, the vehicle communication device 22 extracts the collision possibility information included in the synthesis information. The vehicle communication device 22 extracts information about the device-installed vehicle included in the collision possibility information.

After S241, the vehicle communication device 22 performs the process of S164. At S164, the vehicle communication device 22 determines whether the device-installed vehicle and another of the vehicles have a collision on the basis of the extracted information.

The vehicle communication device 22 according to the third embodiment receives the collision possibility information from the roadside communication device 32 and determines whether the device-installed vehicle and another of the vehicles have a collision. This configuration eliminates the need for the vehicle communication device 22 to extract vehicle information from synthesis information, update mapping information, and perform analysis on the basis of the updated mapping information, thereby reducing the process performed by the vehicle communication device 22.

Fourth Embodiment

Figure 19:
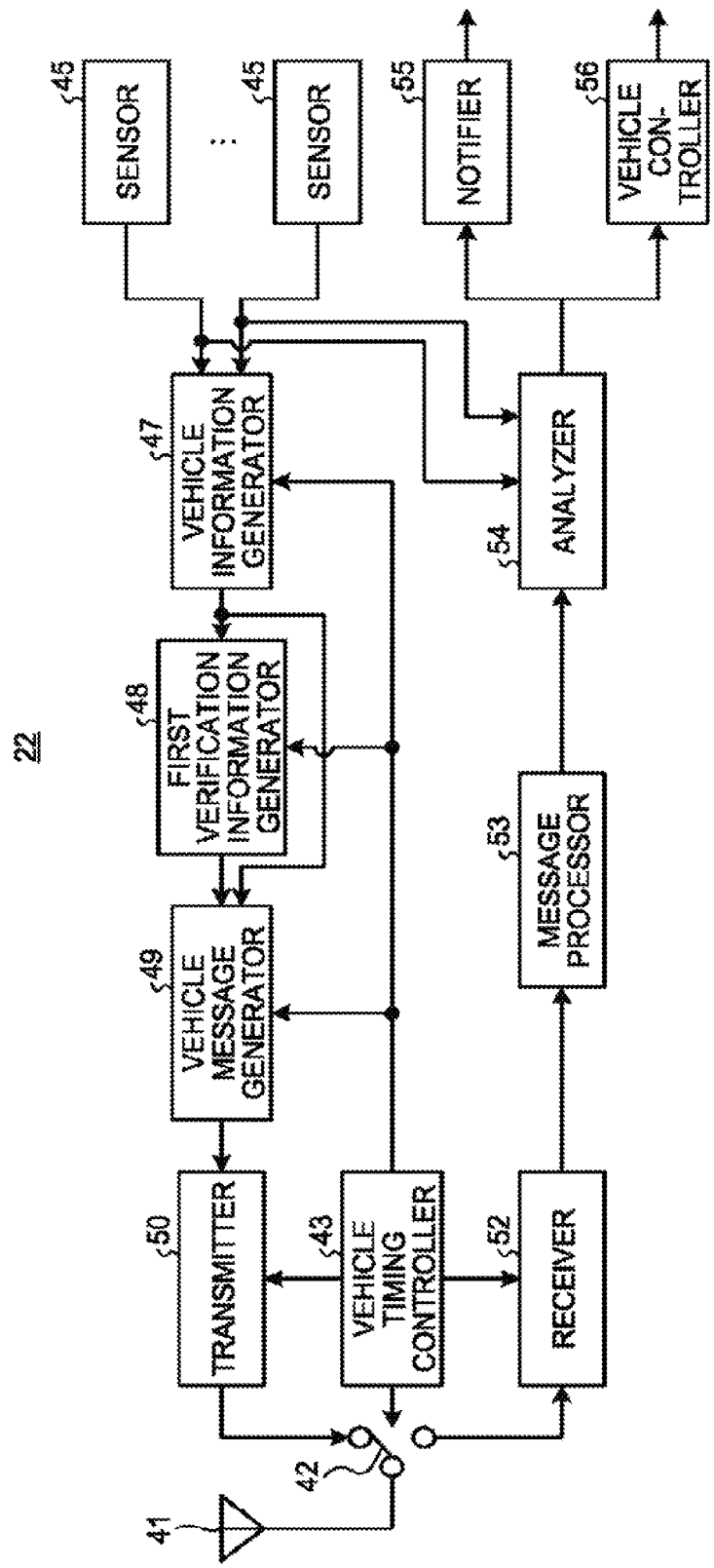
FIG. 19 is a diagram illustrating a functional configuration of a vehicle communication device according to a fourth embodiment.

FIG. 19 is a diagram illustrating a functional configuration of the vehicle communication device 22 according to a fourth embodiment. The vehicle communication device 22 according to the fourth embodiment provides a detection result of the at least one sensor 45 to the analyzer 54.

The at least one sensor 45 according to the fourth embodiment detects the position, size, velocity, and moving direction of an object present therearound, in addition to the information about a motion for generating vehicle information. Examples of the object include another of the vehicles, pedestrians, and obstacles on the road.

The analyzer 54 acquires at least one of the position, size, velocity, and moving direction of the object present therearound detected by the at least one sensor 45. The analyzer 54 analyzes a possibility that the device-installed vehicle and the object will have a collision on the basis of the detection result of the at least one sensor 45 and the mapping information. For example, the analyzer 54 determines whether the device-installed vehicle and the object have a collision on the basis of the detection result of the at least one sensor 45 and the mapping information. When the mapping information and the detection result of the sensor 45 are inconsistent with each other, the analyzer 54 may preferentially use the detection result of the sensor 45.

The vehicle communication device 22 according to the fourth embodiment determines whether the device-installed vehicle and an object (e.g., another of the vehicles or a pedestrian) have a collision on the basis of the mapping information and the detection result of the sensor 45. With this configuration, the vehicle communication device 22 can alert the driver or can control the motion of the device-installed vehicle to avoid collision with the object on the basis of additional information.

Figure 20:
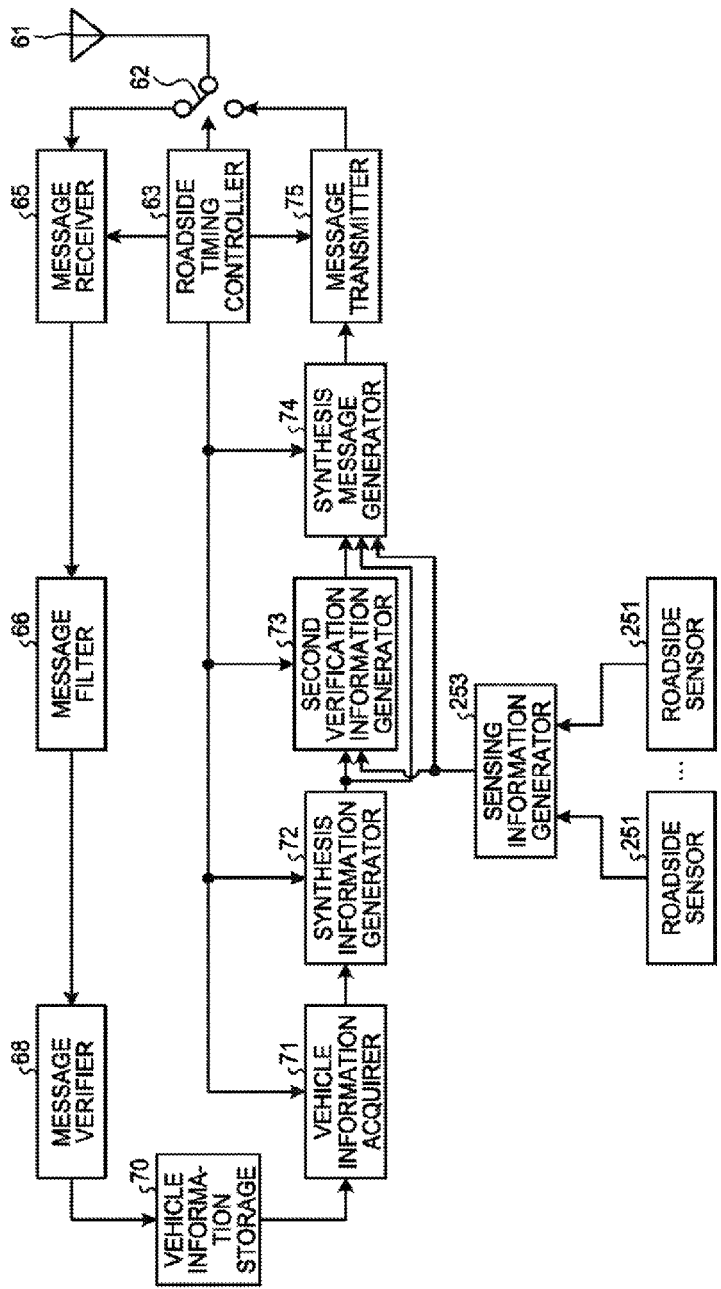
FIG. 20 is a diagram illustrating a functional configuration of a roadside communication device according to the fourth embodiment.

FIG. 20 is a diagram illustrating a functional configuration of the roadside communication device 32 according to the fourth embodiment. The roadside communication device 32 according to the fourth embodiment further includes at least one roadside sensor 251 and a sensing information generator 253.

The at least one roadside sensor 251 detects at least one of the position, size, velocity, and moving direction of an object (e.g., a vehicle 20, a pedestrian, or an obstacle on the road) present around the roadside device 30. The sensing information generator 253 generates sensing information representing at least one of the position, size, velocity, and moving direction of the object present around the roadside device 30 on the basis of the detection result of the at least one roadside sensor 251. The sensing information generator 253 provides the generated sensing information to the second verification information generator 73 and the synthesis message generator 74.

In the fourth embodiment, the second verification information generator 73 further generates verification information (third verification information) indicative of the validity of the sensing information. The synthesis message generator 74 further generates a sensing message including the sensing information generated by the sensing information generator 253 and the verification information indicative of the validity of the sensing information.

The message transmitter 75 acquires the sensing message together with the synthesis message. The message transmitter 75 transmits the acquired synthesis message and sensing message into a certain channel via the roadside antenna 61 at the transmission timing specified by the roadside timing controller 63.

When the vehicle communication device 22 according to the fourth embodiment receives a sensing message from the roadside communication device 32, the vehicle communication device 22 verifies the sensing information included in the sensing message by referring to the verification information indicative of the validity of the sensing information. The vehicle communication device 22 then analyzes a possibility that the device-installed vehicle and an object will have a collision on the basis of the sensing information verified as valid. When the detection result of the sensor 45 and the received sensing information are inconsistent with each other, the vehicle communication device 22 may preferentially use the detection result of the sensor 45.

The roadside communication device 32 according to the fourth embodiment can transmit the generated sensing information to the vehicle communication device 22. The vehicle communication device 22 determines whether the device-installed vehicle and an object (e.g., another of the vehicles or a pedestrian) have a collision on the basis of the sensing information received from the roadside communication device 32. With this configuration, the vehicle communication device 22 can alert the driver or can control the motion of the device-installed vehicle to avoid collision with the object on the basis of additional information.

The message transmitter 75 may include the sensing information in the synthesis information. In this case, the roadside communication device 32 do not necessarily generate or transmit the sensing message.

The at least one roadside sensor 251 may be installed in the roadside communication device 32 according to the third embodiment. In this case, the synthesis mapping analyzer 231 acquires at least one of the position, size, velocity, and moving direction of an object present around the roadside device 30 detected by the at least one roadside sensor 251. The synthesis mapping analyzer 231 analyzes a possibility that two or more vehicles 20 will have a collision on the basis of the detection result of the at least one roadside sensor 251 and the synthesis mapping information. With this configuration, the roadside communication device 32 can generate the collision possibility information on the basis of additional information.

Figure 21:
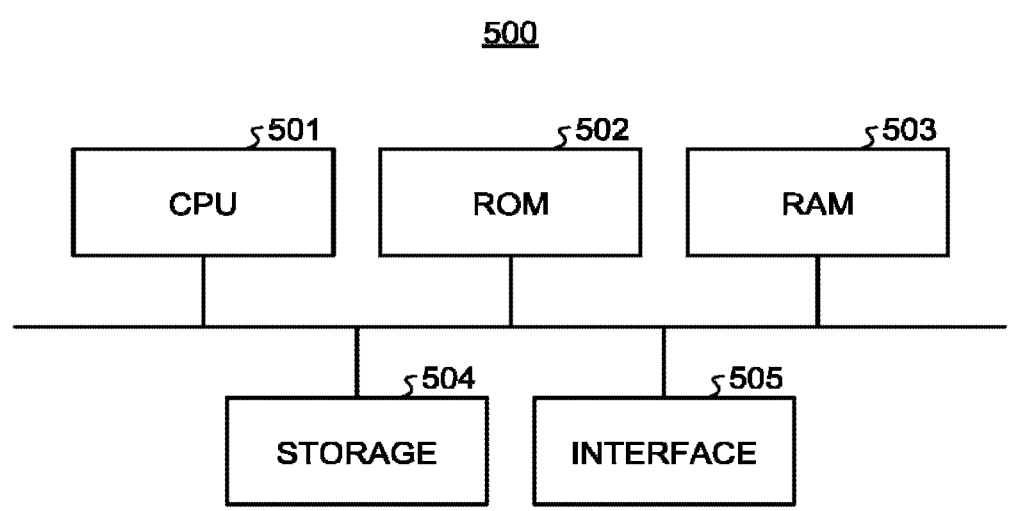
FIG. 21 is a diagram illustrating a hardware configuration of an information processing device.

FIG. 21 is a diagram illustrating an example of a hardware configuration of an information processing device 500 according to the embodiments. A part of the constituent units in the vehicle communication device 22 and the roadside communication device 32 described above can be implemented by the information processing device 500 illustrated in, for example, FIG. 21.

The information processing device 500 has the same configuration as that of an ordinary computer. In other words, the information processing device 500 includes a central processing unit (CPU) 501, a read only memory (ROM) 502, a random access memory (RAM) 503, a storage 504, and an interface 505. The CPU 501, the ROM 502, the RAM 503, the storage 504, and the interface 505 are connected with each other via a bus.

The CPU 501 loads a computer program stored in the storage 504 onto the RAM 503 and executes the computer program to control the units to input and output data and to process data. The ROM 502 stores therein a starting program for reading the boot program of the operating system from the storage 504 to the RAM 503. The RAM 503 functions as a work area of the CPU 501 and stores therein data.

The storage 504 is, for example, a hard disk drive or a flash memory. The storage 504 stores therein the operating system, application programs, and data. These computer programs are recorded and distributed in a computer-readable recording medium as an installable or executable file. The computer programs may be distributed by being downloaded from a server. The interface 505 is a device for transmitting and receiving information to and from other devices.

A computer program executed by the information processing device 500 according to the embodiments above is recorded and provided in a computer-readable recording medium such as a compact disc read-only memory (CD-ROM), a flexible disk (FD), a compact disc recordable (CD-R), and a digital versatile disc (DVD), as an installable or executable file. The computer program executed by the information processing device 500 according to the embodiments above may be stored in a computer connected to a network such as the Internet and provided by being downloaded via the network. Furthermore, the computer program executed by the information processing device 500 according to the embodiments above may be provided or distributed via a network such as the Internet. The computer program according to the embodiments above may be embedded and provided in the ROM 502, for example.

A computer program for causing the information processing device 500 to function as the vehicle communication device 22 includes a vehicle information generator module, a first verification information generator module, a vehicle message generator module, a message processor module, an analyzer module, a notifier module, and a vehicle controller module. In the information processing device 500, a processor (CPU 501) reads the computer program from a storage medium (e.g., the storage 504) and executes it. The modules are then loaded on a main memory (RAM 503), and the processor (CPU 501) functions as the vehicle information generator 47, the first verification information generator 48, the vehicle message generator 49, the message processor 53, the analyzer 54, the notifier 55, and the vehicle controller 56. A part or all of the vehicle information generator 47, the first verification information generator 48, the vehicle message generator 49, the message processor 53, the analyzer 54, the notifier 55, and the vehicle controller 56 may be implemented by hardware other than the processor.

A computer program for causing the information processing device 500 to function as the roadside communication device 32 includes a message filter module, a message verifier module, a vehicle information acquisition module, a synthesis information generator module, a second verification information generator module, and a synthesis message generator module. In the information processing device 500, a processor (CPU 501) reads the computer program from a storage medium (e.g., the storage 504) and executes it. The modules are then loaded on a main memory (RAM 503), and the processor (CPU 501) functions as the message filter 66, the message verifier 68, the vehicle information acquirer 71, the synthesis information generator 72, the second verification information generator 73, and the synthesis message generator 74. A part or all of the message filter 66, the message verifier 68, the vehicle information acquirer 71, the synthesis information generator 72, the second verification information generator 73, and the synthesis message generator 74 may be implemented by hardware other than the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication device installed in a movable body, the device comprising:
   a receiver configured to receive a synthesis message including synthesis information and second verification information, the synthesis information being generated based on two or more pieces of movable body information, each of the two or more pieces of movable body information being information about a motion of a movable body including the movable body installed with the device, the second verification information being information indicative of a validity of the synthesis information;
   a verifier configured to verify the validity of the synthesis information on the basis of the second verification information; and
   a mapping generator configured to generate mapping information on the basis of the synthesis information verified as valid, the mapping information representing a relative position of at least one of the movable bodies with respect to the movable body installed with the device.

2. The device according to claim 1, wherein
   the synthesis information is information in which two or more pieces of movable body information are concatenated,
   the mapping generator is configured to extract each piece of movable body information from the synthesis information verified as valid and to generate the mapping information on the basis of the extracted piece of movable body information.

3. The device according to claim 2, wherein
in a case where two or more pieces of the movable body information from a same movable body are acquired, the mapping generator is configured to generate the mapping information on the basis of the movable body information having a latest transmitting time.

4. The device according to claim 2, wherein
the mapping generator is configured to correct the movable body information according to an elapsed time from a transmitting time and to generate the mapping information on the basis of corrected movable body information.

5. The device according to claim 1, wherein
the receiver is further configured to receive a movable body message including movable body information and first verification information, the movable body information being information about a motion of a movable body, the first verification information being information indicative of a validity of the movable body information,
the verifier is further configured to verify the validity of the movable body information on the basis of the first verification information,
the mapping generator is configured to update the mapping information on the basis of the movable body information verified as valid.

6. The device according to claim 5, wherein
the verifier is configured to prioritize verifying the synthesis information over verifying the movable body information.

7. The device according to claim 6, wherein
the verifier is configured to prioritize verifying the movable body information included in the movable body message that is transmitted from an emergency movable body, over verifying the movable body information included in the movable body message that is transmitted from a movable body other than the emergency movable body.

8. The device according to claim 6, wherein
the verifier is configured to prioritize verifying the movable body information included in the movable body message that is transmitted from another movable body inside a first area, over verifying the movable body information included in the movable body message that is transmitted from a still another movable body outside of the first area, the first area being an area defined by a predetermined distance from the movable body installed with the device.

9. The device according to claim 1, wherein
the synthesis information includes synthesis mapping information, the synthesis mapping information representing a position of each of the movable bodies,
the mapping generator is configured to generate the mapping information on the basis of the synthesis mapping information included in the synthesis information verified as valid.

10. The device according to claim 1, further comprising:
an analyzer configured to analyze, on the basis of the mapping information, a possibility that the movable body installed with the device and another movable body of the movable bodies have a collision, wherein
the synthesis information includes collision possibility information indicative of a possibility that each of the movable bodies has a collision,
the analyzer is further configured to analyze, on the basis of the collision possibility information, a possibility that the movable body installed with the device and the other movable body have a collision.

11. The device according to claim 1, further comprising:
a sensor configured to detect information about a motion of the movable body installed with the device or a position of an object that is present around the movable body; and
an analyzer configured to analyze, on the basis of a detection result of the sensor and the mapping information, a possibility that the movable body installed with the device and the object have a collision.

12. The device according to claim 11, wherein
the receiver is further configured to receive a sensing message including sensing information and third verification information, the sensing information being information indicative of a position of an object, the third verification information being information indicative of a validity of the sensing information,
the verifier is further configured to verify the validity of the sensing information on the basis of the third verification information, and
the analyzer is configured to analyze, on the basis of the sensing information verified as valid, the possibility that the movable body installed with the device and the object have a collision.

13. The device according to claim 1, wherein
the synthesis information is generated based on two or more pieces of movable body information verified as valid by an external device.

14. A communication device installed on a roadside, the device comprising:
a message receiver configured to receive a movable body message including movable body information and first verification information, the movable body information being information about a motion of a movable body, the first verification information being information indicative of a validity of the movable body information;
a message verifier configured to verify the validity of the movable body information on the basis of the first verification information;
a synthesis information generator configured to generate synthesis information on the basis of two or more pieces of movable body information verified as valid, the synthesis information being information about motions of two or more movable bodies;
a verification information generator configured to generate second verification information indicative of a validity of the synthesis information; and
a message transmitter configured to transmit a synthesis message including the synthesis information and the second verification information.

15. The device according to claim 14, wherein
the synthesis information generator is configured to generate the synthesis information by concatenating two or more pieces of the movable body information verified as valid.

16. The device according to claim 14, wherein
the synthesis information generator is configured to generate synthesis information each of transmission period in which the synthesis message is transmitted,
the message transmitter is configured to transmit the synthesis message each of the transmission period.

17. The device according to claim 14, further comprising:
a message filter configured to delete, from among received movable body messages, a movable body message transmitted from a movable body further away than a predetermined distance.

18. The device according to claim 14, further comprising:
a message filter configured to delete, from among received movable body messages, a movable body message having an unusual value among values included in the movable body information.

19. The device according to claim 14, wherein
the synthesis information generator is configured to generate the synthesis information including synthesis mapping information on the basis of two or more pieces of the movable body information verified as valid, the synthesis mapping information representing a position of each of the movable bodies.

20. The device according to claim 14, wherein the synthesis information generator comprises
a synthesis mapping information generator configured to generate synthesis mapping information on the basis of two or more pieces of the movable body information verified as valid, the synthesis mapping information representing a position of each of the movable bodies, and
a synthesis mapping analyzer configured to analyze the synthesis mapping information, to generate collision possibility information indicative of a possibility that each of the movable bodies has a collision, and to generate the synthesis information including the collision possibility information.

21. A communication method for a device installed in a movable body, the method comprising:
receiving a synthesis message including synthesis information and second verification information, the synthesis information being generated based on two or more pieces of movable body information, each of the two or more pieces of movable body information being information about a motion of a movable body including the movable body installed with the device, the second verification information being information indicative of a validity of the synthesis information;
verifying the validity of the synthesis information on the basis of the second verification information; and
generating mapping information on the basis of the synthesis information verified as valid, the mapping information representing a relative position of at least one of the movable bodies with respect to the movable body installed with the device.

* * * * *